(12) United States Patent
Matsuura et al.

(10) Patent No.: US 7,280,610 B2
(45) Date of Patent: Oct. 9, 2007

(54) DATA CONVERTER, SIGNAL GENERATOR, TRANSMITTER AND COMMUNICATION APPARATUS USING THE DATA CONVERTER OR THE SIGNAL GENERATOR, AND DATA CONVERSION METHOD

(75) Inventors: Toru Matsuura, Osaka (JP); Hisashi Adachi, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 775 days.

(21) Appl. No.: 10/683,476

(22) Filed: Oct. 10, 2003

(65) Prior Publication Data

US 2004/0128279 A1 Jul. 1, 2004

(30) Foreign Application Priority Data

Oct. 17, 2002 (JP) ............................. 2002-303520

(51) Int. Cl.
*H04L 27/04* (2006.01)
(52) U.S. Cl. ..................................... 375/295
(58) Field of Classification Search ................ 375/295, 375/296, 297, 298
See application file for complete search history.

(56) References Cited

U.S. PATENT DOCUMENTS

2003/0123566 A1* 7/2003 Hasson ....................... 375/279

OTHER PUBLICATIONS

Takafumi Yamaji, et al., "A Digital-To-RF Converter Architecture Suitable for a Digial-to RF Direct-Conversion Software Defined Radio Transmitter", IEICE Trans. Commun. vol. E83-B, No. 6, Jun. 2000, pp. 1254-1260.

B. Razavi, "RF Microelectronics", Prentice-Hall PTR, 1998 (p. 153, Fig. 5.39).

* cited by examiner

*Primary Examiner*—Kevin Kim
(74) *Attorney, Agent, or Firm*—Smith, Gambrell & Russell, LLP

(57) ABSTRACT

A data converter arranged to enable linear high-efficiency amplification of a signal having a fluctuating envelope. The data converter has a computation circuit, a vector quantizer, and an output terminal. The computation circuit is formed by connecting n (n: a natural number) number of unit circuits each including a vector subtracter having a first input terminal and a second input terminal, and a vector integrator connected to an output side of the vector subtracter. An output at the output terminal and/or an output from each vector integrator are input to the vector subtracter through the second input terminal in the corresponding unit circuit. The vector subtracter outputs data obtained by subtracting a vector input through the second input terminal from a vector input through the first input terminal. The vector quantizer outputs a predetermined value quantized at least with respect to the magnitude of the input vector.

29 Claims, 30 Drawing Sheets

DATA CONVERTER, SIGNAL GENERATOR, TRANSMITTER AND COMMUNICATION APPARATUS USING THE DATA CONVERTER OR THE SIGNAL GENERATOR, AND DATA CONVERSION METHOD

BACKGROUND OF THE INVENTION

1. Field of the Invention

The present invention relates to a data converter, a signal generator, a transmitter using the data converter and the signal generator, a communication apparatus such as a cell phone or wireless LAN using the data converter and the signal generator, and a data conversion method.

2. Related Art of the Invention

FIG. 27 shows an example of a conventional transmitting circuit (see B. Razavi, "RF Microelectronics" Prentice-Hall PTR, 1998 (p. 153, FIG. 5. 39), for example). Referring to FIG. 27, I (in-phase) data and Q (quadrature-phase) data are respectively output from two output terminals of a data generator 5001. These groups of data are input to and modulated by a modulator 5002. An output from the modulator 5002 is amplified by an amplifier 5003 and radiated from an antenna 5004.

In the transmitting circuit shown in FIG. 27, however, the envelope of a signal to be radiated from the antenna 5004 fluctuates and it is required that the amplifier 5003 have certain linearity to avoid degradation of such a signal. In order to ensure certain linearity of the amplifier 5003, it is necessary to make the amplifier 5003 operate in a linear region such that the output of the amplifier 5003 is substantially lower than a saturated level. In such a case, the power consumption is increased.

Description will be made of this more concretely with reference to FIG. 28. FIG. 28 is a graph showing the output power and the efficiency of the amplifier 5003 with respect to input power. From the viewpoint of improving the efficiency of the amplifier 5003, higher input power and higher output power are desirable. That is, when the input power is Pin2, the output power is Pout 2 and the efficiency is η2. At such an operating point, an input signal having such a characteristic that its envelope fluctuates is distorted. In practice, the amplifier 5003 can not be used at such an operating point. In order to reduce the distortion, it is necessary to reduce the input power and the output power. If the input power and the output power are reduced, the efficiency is reduced. That is, when the input power is Pin1, the output power is Pout1 and the efficiency is η1.

SUMMARY OF THE INVENTION

An object of the present invention is to provide a data converter, a signal generator, a transmitter, a communication apparatus and a data conversion method capable of reducing the influence of the nonlinearity of an amplifier and enabling high-efficiency operation.

The 1st aspect of the present invention is a data converter comprising:

a parallel data input terminal through which parallel data having in-phase data and quadrature-phase data are input;

a computation circuit connected to said parallel data input terminal;

a first vector quantizer connected to an output side of said computation circuit; and an output terminal connected to an output side of said first vector quantizer, wherein said in-phase data and said quadrature-phase data are forming a predetermined vector;

said computation circuit is formed by connecting n (n: a natural number) number of unit circuits each including a first vector subtracter having a first input terminal and a second input terminal, and a vector integrator connected to an output side of said first vector subtracter;

an output at said output terminal and/or an output from said vector integrator in each of said unit circuits is input to the first vector subtracter through the second input terminal of the same in the unit circuit;

said parallel data input terminal is connected to the first input terminal of the first vector subtracter in the first circuit unit;

an output terminal of the vector integrator and the first input terminal of the first vector subtracter are connected to each other between said unit circuits;

said first vector subtracter outputs parallel data obtained by subtracting a vector formed by parallel data input through said second input terminal from a vector formed by parallel data input through said first input terminal; and said vector integrator integrates the vector formed by the input parallel data, and said first vector quantizer outputs a predetermined value quantized at least with respect to the magnitude of an input vector.

The 2nd aspect of the present invention is the data converter according to the 1st aspect of the present invention, wherein said first vector quantizer outputs a vector having a phase equal to that of the input vector.

The 3rd aspect of the present invention is the data converter according to the 1st aspect of the present invention, wherein said first vector quantizer outputs a vector having a magnitude corresponding to a predetermined threshold value and having a phase equal to that of the input vector when the magnitude of the vector input to said first vector quantizer is equal to or larger than the predetermined threshold value; and said first vector quantizer outputs a zero vector when the magnitude of the vector input to said first vector quantizer is smaller than the predetermined threshold value.

The 4th aspect of the present invention is the data converter according to the 1st aspect of the present invention, wherein said first vector quantizer performs quantization with respect to each of the magnitude and the phase of the vector.

The 5th aspect of the present invention is a data converter comprising:

a parallel data input terminal through which parallel data having a predetermined vector is input;

a first vector subtracter having a first input terminal and a second input terminal, the first input terminal being connected to said parallel data input terminal;

a second vector quantizer connected to an output side of said first vector subtracter; and an output terminal connected to an output side of said second vector quantizer, wherein said second vector quantizer outputs a predetermined value quantized at least with respect to the magnitude of an input vector;

the quantized predetermined value is input to said first vector subtracter through the second input terminal of the same; and said first vector subtracter outputs parallel data obtained by subtracting a vector formed by parallel data input through said second input terminal from a vector formed by the parallel data input through said first input terminal.

The 6th aspect of the present invention is the data converter according to the 5th aspect of the present invention, wherein said second vector quantizer outputs a vector having the same phase as that of the input vector.

The 7th aspect of the present invention is the data converter according to the 5th aspect of the present invention, wherein said second vector quantizer performs quantization with respect to each of the magnitude and the phase of the vector.

The 8th aspect of the present invention is the data converter according to the 5th aspect of the present invention, further comprising a second vector subtracter having a first input terminal and a second input terminal, the first input terminal being connected to the output side of said second vector quantizer, wherein an output of said first vector subtracter is also connected to the second input terminal of said second vector subtracter;

said second vector subtracter outputs parallel data obtained by subtracting a vector formed by parallel data input through the second input terminal of said second vector subtracter from a vector formed by parallel data input through the first input terminal of said second vector subtracter; and an output from said second vector quantizer is input to said first vector subtracter through the second input terminal of the same via said second vector subtracter.

The 9th aspect of the present invention is the data converter according to the 1st aspect of the present invention, wherein said first vector subtracter has a first scalar subtracter having a first input terminal and a second input terminal through which first data is input, and a second scalar subtracter having a first input terminal and a second input terminal through which second data in an orthogonal relationship with said first data is input;

said vector integrator has a first scalar integrator connected to an output of said first scalar subtracter, and a second scalar integrator connected to an output of said second scalar subtracter:

said first vector quantizer has a first coordinate converter to which an output from said first scalar integrator and an output from said second scalar integrator are respectively input as data in an orthogonal coordinate system, which converts the input data in the orthogonal coordinate system into data in a polar coordinate system, and which outputs the data in the polar coordinate system as amplitude data and phase data, a first scalar quantizer which quantizes at least the amplitude data output from said first coordinate converter, and a second coordinate converter which is connected to an output side of said first scalar quantizer and/or an output side of said first coordinate converter, and which outputs third data corresponding to the first data and fourth data corresponding to the second data as data in the orthogonal coordinate system from the amplitude data and the phase data output as data in the polar coordinate system from said first scalar quantizer and/or said first coordinate converter;

said first scalar quantizer is connected to the output side of said first coordinate converter and outputs at least amplitude data quantized as the predetermined value;

said output terminal includes a first output terminal which is connected to said second coordinate converter and through which the third data is output, and a second output terminal which is connected to said second coordinate converter and through which the fourth data is output; and at least one of the third data and the output from each of said first scalar integrators is input to at least one of said first scalar subtracters through the second input terminal of the same, and at least one of the fourth data and the output from each of said second scalar integrators is input to at least one of said second scalar subtracters through the second input terminal of the same.

The 10th aspect of the present invention is the data converter according to the 9th aspect of the present invention, wherein said number n is 1;

the third data is input to said first scalar subtracter through the second input terminal, said first scalar subtracter subtracts the third data from the first data, and data obtained as a subtraction result by said first scalar subtracter is output to said first scalar integrator; and the fourth data is input to said second scalar subtracter through the second input terminal, said second scalar subtracter subtracts the fourth data from the second data, and data obtained as a subtraction result by said second scalar subtracter is output to said second scalar integrator.

The 11th aspect of the present invention is the data converter according to the 10th aspect of the present invention, wherein said first vector quantizer outputs a vector having the same phase as that of an input vector.

The 12th aspect of the present invention is the data converter according to the 10th aspect of the present invention, wherein said first vector quantizer quantizes the amplitude data and also quantizes the phase data.

The 13th aspect of the present invention is the data converter according to the 5th aspect of the present invention, wherein said first vector subtracter has a first scalar subtracter having a first input terminal and a second input terminal through which first data is input, and a second scalar subtracter having a first input terminal and a second input terminal through which second data in an orthogonal relationship with the first data is input;

said second vector quantizer has a first coordinate converter to which an output from said first scalar subtracter and an output from said second scalar subtracter are respectively input as data in an orthogonal coordinate system, which converts the input data in the orthogonal coordinate system into data in a polar coordinate system, and which outputs the data in the polar coordinate system as amplitude data and phase data, a second scalar quantizer which quantizes at least the amplitude data output from said first coordinate converter, and a second coordinate converter which outputs third data corresponding to the first data and fourth data corresponding to the second data obtained by converting the amplitude data and the phase data output as data in the polar coordinate system from said second scalar quantizer and/or said first coordinate converter into data in the orthogonal coordinate system;

said second scalar quantizer is connected to an output side of said first coordinate converter and outputs at least amplitude data quantized as the predetermined value;

said output terminal includes a first output terminal which is connected to said second coordinate converter and through which the third data is output, and a second output terminal which is connected to said second coordinate converter and through which the fourth data is output;

the third data is input to said first scalar subtracter through the second input terminal of the same, said first scalar subtracter subtracts the third data from the first data, and data obtained as a subtraction result by said first scalar subtracter is input to said first coordinate converter as one of two inputs to the same; and the fourth data is input to said second scalar subtracter through the second input terminal of the same, said second scalar subtracter subtracts the fourth data from the second data, and data obtained as a subtraction result by said second scalar subtracter is input to said first coordinate converter as the other input to the same.

The 14th aspect of the present invention is the data converter according to the 13th aspect of the present invention, wherein said second vector quantizer outputs a vector having the same phase as that of an input vector.

The 15th aspect of the present invention is the data converter according to the 13th aspect of the present invention, wherein said second vector quantizer quantizes the amplitude data with respect to the magnitude of the vector, and also quantizes the phase data with respect to the phase of the vector.

The 16th aspect of the present invention is the data converter according to the 8th aspect of the present invention, wherein said first vector subtracter has a first scalar subtracter having a first input terminal and a second input terminal through which first data is input, and a second scalar subtracter having a first input terminal and a second input terminal through which second data in an orthogonal relationship with the first data is input;

said second vector quantizer has a first coordinate converter to which an output from said first scalar subtracter and an output from said second scalar subtracter are respectively input as data in an orthogonal coordinate system, which converts the input data in the orthogonal coordinate system into data in a polar coordinate system, and which outputs the data in the polar coordinate system as amplitude data and phase data, a second scalar quantizer which quantizes at least the amplitude data output from said first coordinate converter, and a second coordinate converter which outputs third data corresponding to the first data and fourth data corresponding to the second data obtained by converting the amplitude data and the phase data output as data in the polar coordinate system from said second scalar quantizer and/or said first coordinate converter into data in the orthogonal coordinate system;

said second scalar quantizer is connected to an output side of said first coordinate converter and outputs at least amplitude data quantized as the predetermined value;

said second vector subtracter includes a third scalar subtracter which has a first input terminal through which the third data is input, and a second input terminal through which output data from said first scalar subtracter is input, and which outputs fifth data obtained by subtracting the output data from said first scalar subtracter from the third data, and a fourth scalar subtracter which has a first input terminal through which the fourth data is input, and a second input terminal through which output data from said second scalar subtracter is input, and which outputs sixth data obtained by subtracting the output data from said second scalar subtracter from the fourth data;

the fifth data is input to said first scalar subtracter through the second input terminal of the same, said first scalar subtracter subtracts the fifth data from the first data, and data obtained as a subtraction result by said first scalar subtracter is input to said first coordinate converter as one of two inputs to the same; and the sixth data is input to said second scalar subtracter through the second input terminal of the same, said second scalar subtracter subtracts the sixth data from the second data, and data obtained as a subtraction result by said second scalar subtracter is input to said first coordinate converter as the other input to the same.

The 17th aspect of the present invention is the data converter according to the 16th aspect of the present invention, wherein said second vector quantizer outputs a vector having the same phase as that of an input vector.

The 18th aspect of the present invention is the data converter according to the 16th aspect of the present invention, wherein said second vector quantizer quantizes the amplitude data with respect to the magnitude of the vector, and also quantizes the phase data with respect to the phase of the vector.

The 19th aspect of the present invention is the data converter according to the 1st or the 10th aspects of the present invention, wherein said first vector quantizer has n number of threshold values, outputs a vector having a magnitude corresponding to the largest of the n threshold values and having a phase equal to that of a vector input to said first vector quantizer when the magnitude of the input vector to said first vector quantizer is larger than the largest of the n threshold value, outputs a zero vector when the magnitude of the input vector is smaller than the smallest of the n threshold values, and outputs a vector having a magnitude corresponding to the largest of the threshold values smaller than the magnitude of the input vector and having a phase equal to that of the input vector when the magnitude of the input vector is between the smallest and the largest of the n threshold values.

The 20th aspect of the present invention is the data converter according to the 5th or the 8th aspects of the present invention, wherein said second vector quantizer outputs a vector having a predetermined amplitude and a phase equal to that of the input vector.

The 21st aspect of the present invention is the data converter according to the 5th or the 8th aspects of the present invention, wherein said second vector quantizer outputs "a" when the input vector is smaller than the middle value between "a" and "b" (a, b: a real number not negative, a<b), and outputs "b" when the input vector is equal to or larger than the middle value.

The 22nd aspect of the present invention is a signal generator comprising the data converter according to the 1st or the 5th aspects of the present invention, and a quadrature modulator which performs quadrature modulation of an output from said data converter.

The 23rd aspect of the present invention is the signal generator according to the 22nd aspect of the present invention, wherein said data converter is realized by digital signal processing.

The 24th aspect of the present invention is a transmitter comprising:

the signal generator according to the 22nd aspect of the present invention;

an amplifier directly or indirectly connected to the quadrature modulator of said signal generator;

a bandpass filter connected to said amplifier; and an antenna directly or indirectly connected to said bandpass filter.

The 25th aspect of the present invention is the transmitter according to the 24th aspect of the present invention, further comprising a low-pass filter provided between an output side of said data converter and an input side of said quadrature modulator to transmit a signal output from said data converter to said quadrature modulator while performing low-pass filtering on the signal.

The 26th aspect of the present invention is the transmitter according to the 24th aspect of the present invention, wherein the predetermined value is controlled according to the kind of a modulated wave output from the transmitter.

The 27th aspect of the present invention is the transmitter according to the 24th aspect of the present invention, wherein the pass frequency of the bandpass filter is controlled according to the frequency of a signal to be output.

The 28th aspect of the present invention is the transmitter according to the 24th aspect of the present invention, wherein said data converter generates data for compensation for nonlinearity of said amplifier.

The 29th aspect of the present invention is a transmitter comprising:

a data generator generating parallel data;

the data converter according to the 1st or the 5th aspects of the present invention connected to said data generator;

a first modulator connected to said data converter;

a first amplifier connected to said first modulator;

a third vector subtracter having one input side connected to said data generator;

a second modulator connected to an output side of said third vector subtracter;

a second amplifier connected to said second modulator;

a combiner to which an output side of said first amplifier and an output side of said second amplifier are respectively connected as inputs, and which combines an output from said first amplifier and an output from said second amplifier into a combined signal and outputs the combined signal; and an antenna connected to an output side of said combiner, wherein an output of said data converter is also connected to another input side of said third vector subtracter;

said third vector subtracter outputs quantization noise data by subtracting parallel data generated by said data generator from parallel data converted by said data converter; and said combining is performed virtually in an equal-amplitude phase-opposition manner with respect to the quantization noise data.

The 30th aspect of the present invention is a communication apparatus comprising the transmitter according to the 25th aspect of the present invention, a receiver for receiving a signal, and an antenna for transmitting and/or receiving a signal.

The 31st aspect of the present invention is a data conversion method comprising:

a step of inputting parallel data having in-phase data and quadrature-phase data through a parallel data input terminal;

a step of performing an operation step including a vector subtraction step and a vector integration step n times (n: a natural number) in a computation circuit connected to the parallel data input terminal; and a step of outputting a predetermined value quantized at least with respect to the magnitude of a vector output from the computation circuit, wherein said in-phase data and said quadrature-phase data are forming a predetermined vector;

said vector subtraction step includes a step of outputting parallel data obtained by subtracting from the vector formed by the input parallel data a vector output from the computation circuit and/or a vector output by said vector integration step; and said vector integration step includes a step of integrating the vector formed by the input parallel data.

According to the present invention, a data converter, a signal generator, a transmitter, a communication apparatus and a data conversion method capable of reducing the influence of the nonlinearity of an amplifier and enabling high-efficiency operation can be provided.

DESCRIPTION OF SYMBOLS

Figure 1:
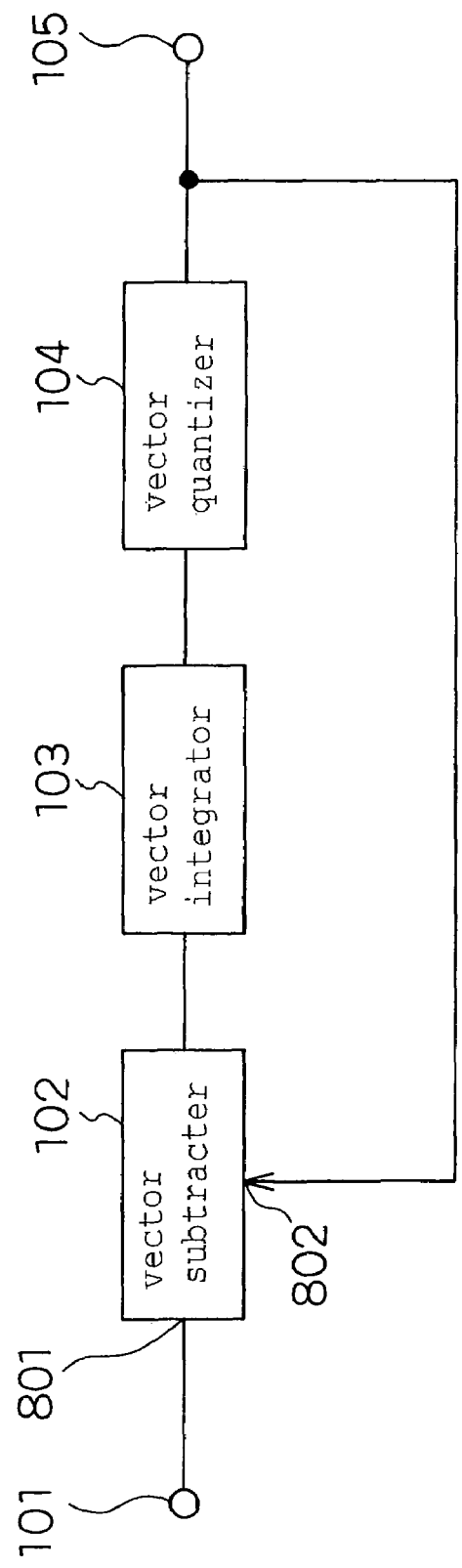
FIG. 1 is a diagram showing the configuration of a data converter in Embodiment 1 of the present invention.

101 input terminal
102 vector subtracter
103 vector integrator
104 vector quantizer
105 output terminal
106 input terminal
107, 109 vector subtracter
108, 110 vector integrator
111 vector quantizer
112, 113 amplifier
114 output terminal
201 input terminal
202 vector subtracter
203 vector quantizer
204 delay device
205 output terminal
301 input terminal
302, 304 vector subtracter
303 vector quantizer
305 delay device
306 output terminal
401, 402 input terminal
403, 404 scalar subtracter
405, 406 scalar integrator
407 coordinate converter (IQ→polar)
408 scalar quantizer
409 coordinate converter (polar→IQ)
411 output terminal
501, 502 input terminal
503, 504 scalar subtracter
505 coordinate converter (IQ→polar)
506 vector quantizer
507 coordinate converter (polar→IQ)
508, 509 delay device
510, 511 output terminal
601, 602 input terminal
603, 604, 608, 609 scalar subtracter
605 coordinate converter (IQ→polar)
606 vector quantizer
607 data converter (polar→IQ)
610, 611 delay device
612, 613 output terminal
701 data generator
702 high-efficiency transmission data converter
703 modulator
704 amplifier
705 bandpass filter
706 antenna
1001 data generator
1002 high-efficiency transmission data converter
1003 modulator
1004 distortion compensation circuit
1005 amplifier
1006 bandpass filter
1007 antenna
1101 data generator
1102 high-efficiency transmission data converter
1103 distortion compensation section
1104 modulator
1105 amplifier
1106 bandpass filter
1107 antenna
1201 data generator
1202 high-efficiency transmission data converter
1203 vector subtracter
1204, 1205 modulator
1206, 1207 amplifier
1208 combiner
1209 output terminal
5001 data generator
5003 amplifier
5004 antenna

PREFERRED EMBODIMENTS OF THE INVENTION

Embodiment 1

Embodiment 1 of the present invention will be described with reference to FIG. 1. Referring to FIG. 1, a first input terminal 801 of a vector subtracter 102, which is an example of the first vector subtracter of the present invention, is connected to an input terminal 101, which is an example of the parallel data input terminal of the present invention. A vector integrator 103, which is an example of the vector integrator of the present invention, is connected to an output of the vector subtracter 102. A vector quantizer 104, which is an example of the first vector quantizer of the present invention, is connected to an output of the vector integrator 103. An output of the vector quantizer 104 is connected to an output terminal 105. An output from the vector quantizer 104 is input to the vector subtracter 102 through a second input terminal 802 of the same.

The operation of this circuit will be described. Parallel data is input through the input terminal 101. This parallel data is assumed to be I data (in-phase data) and Q data (quadrature-phase data). The I data and the Q data are input to the vector integrator 103 via the vector subtracter 102. In the vector integrator 103, the vector formed by the I and Q data is integrated by vector operation. The result of this integration is input to the vector quantizer 104.

Figure 2:
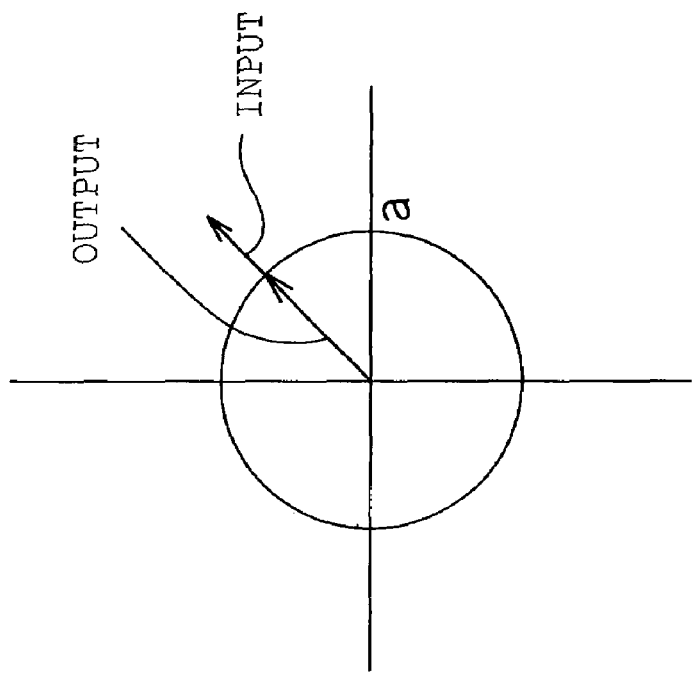
FIG. 2(a) is a diagram for explaining the operation of the data converter in Embodiment 1 of the present invention.
FIG. 2(b) is another diagram for explaining the operation of the data converter in Embodiment 1 of the present invention.
Figure 2:
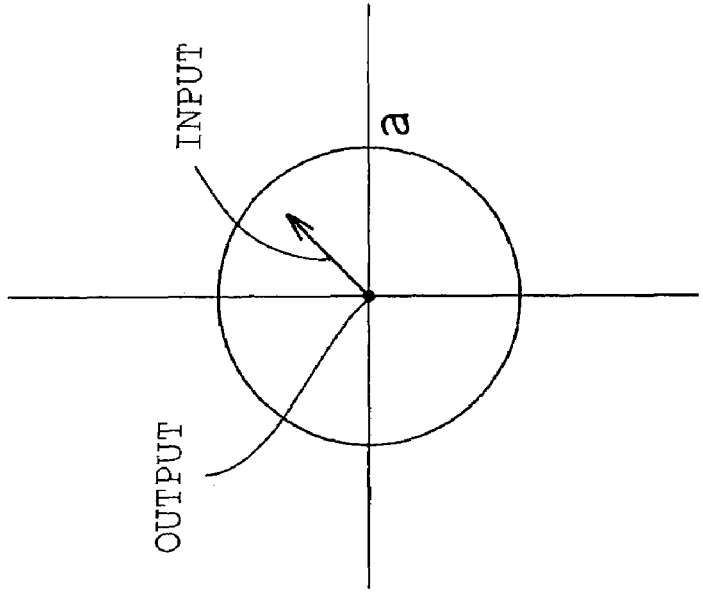
Figure 3:
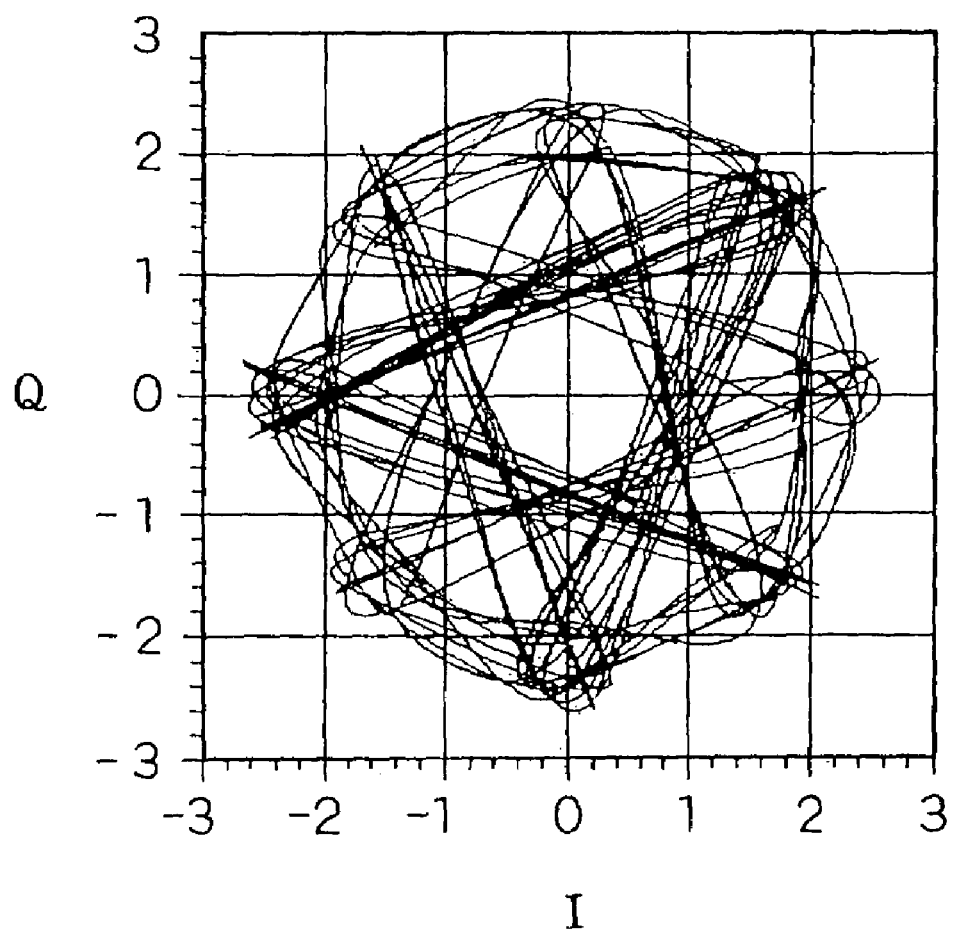
FIG. 3 is a diagram showing input signals to the data converter in Embodiment 1 of the present invention.
Figure 4:
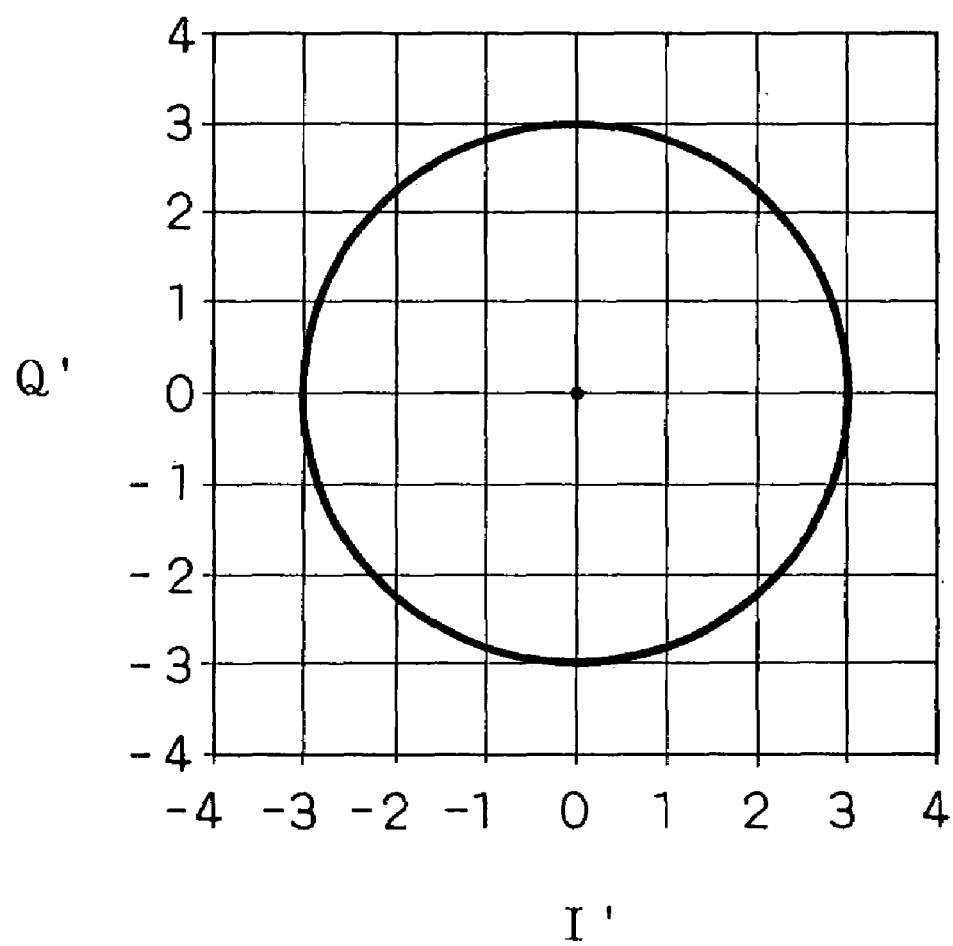
FIG. 4 is a diagram showing output signals from the data converter in Embodiment 1 of the present invention.

Description will first given of a case in which the vector quantizer 104 performs quantization with respect to the magnitude of a vector. If 0<a (a: a real number), the vector quantizer 104 outputs a vector having a magnitude of 0 or "a" according to the magnitude of a vector input to the vector quantizer 104. For example, a quantization method is used in which the magnitude of the output vector is 0 when the magnitude of an input vector is smaller than the threshold value "a" (see FIG. 2(*a*)), and the magnitude of the output vector is "a" when the magnitude of an input vector is not smaller than the threshold value "a" (see FIG. 2(*b*)). There is no particular limitation to the phase of this output vector. A typical example of setting of the phase is such that the phase of the output vector is the same as the phase of the vector input to the vector quantizer 104. This output is output through the output terminal 105 and simultaneously undergoes subtraction in the vector subtracter 102. More specifically, the vector subtracter performs a vector operation to subtract the vector output from the vector quantizer 104 from the vector input through the input terminal 101. FIG. 3 shows the relationship between parallel I and Q data input through the input terminal 101 when a root-raised cosine filter is used in π/4-shift quadrature phase shift keying (QPSK) of a modulated wave, the abscissa representing the I data, the ordinate representing the Q data. FIG. 4 shows the relationship between I' data and Q' data which are output as parallel data through the output terminal 105, the abscissa representing the I' data, the ordinate representing the Q' data.

Figure 5:
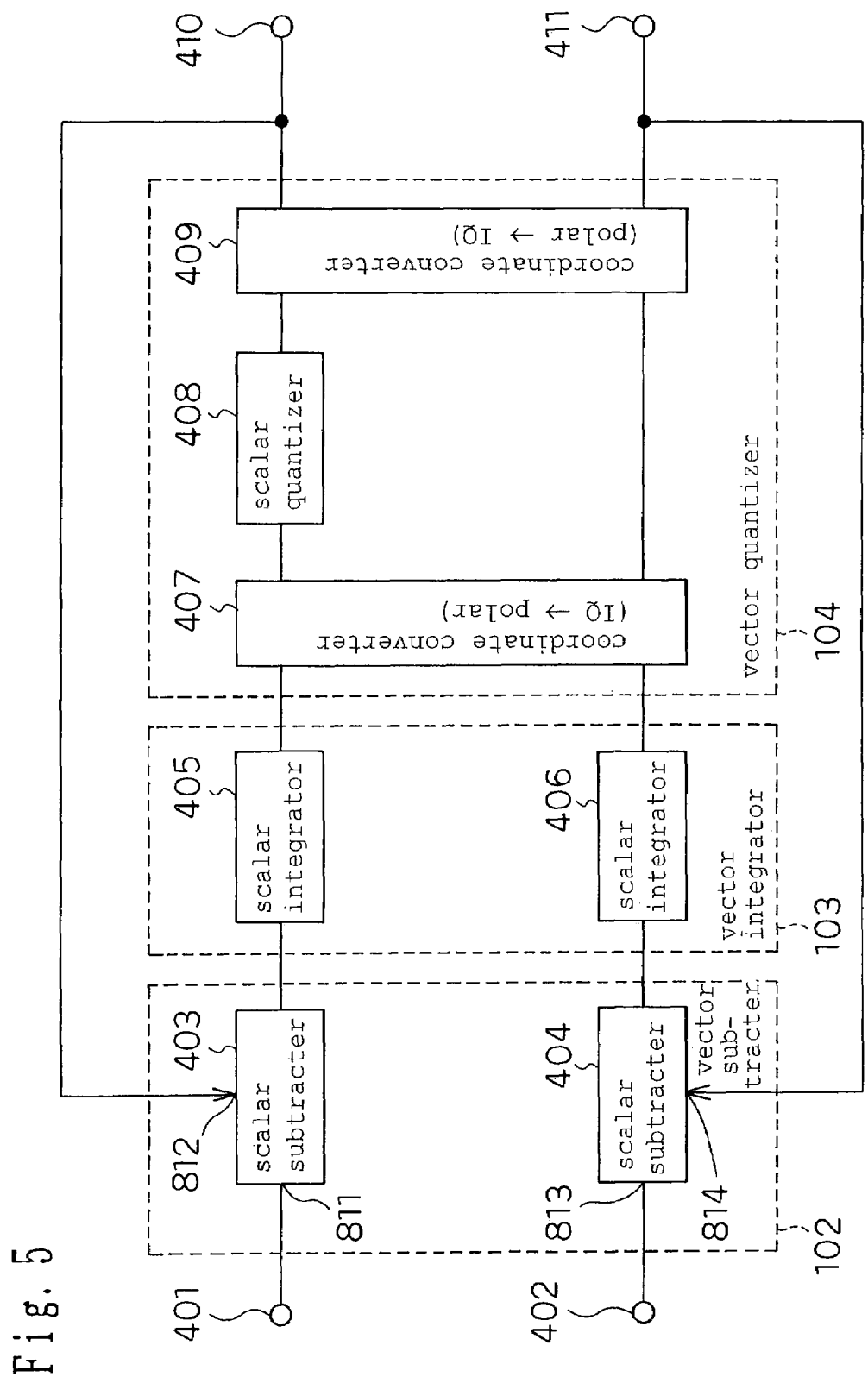
FIG. 5 is a block diagram showing the configuration of a concrete example of the data converter in Embodiment 1 of the present invention.

An example of a circuit by which this data conversion is actually performed will be described with reference to FIG. 5. Referring to FIG. 5, a first input terminal 811 of a scalar subtracter 403, which is an example of the first scalar subtracter of the present invention, is connected to an input terminal 401, and a first input terminal 813 of a scalar subtracter 404, which is an example of the second scalar subtracter of the present invention, is connected to an input terminal 402. A scalar integrator 405, which is an example of the first scalar integrator of the present invention, and a scalar integrator 406, which is an example of the second scalar integrator of the present invention, are respectively connected to outputs of the scalar subtracters 403 and 404. Outputs from the scalar integrators 405 and 406 are input as data in an orthogonal coordinate system to two input terminals of a coordinate converter 407, which is an example of the first coordinate converter of the present invention. A scalar quantizer 408, which is an example of the first scalar quantizer of the present invention, is connected to one output of the coordinate converter 407. An output of the scalar quantizer 408 and another output of the coordinate converter 407 are respectively connected to two inputs of a coordinate converter 409, which is an example of the second coordinate converter of the present invention. The two outputs of the coordinate converter 409 are connected to the second input terminal 812 of the scalar subtracter 403 and the second input terminal 814 of the scalar subtracter 404. One of two output of the coordinate converter 409 is connected to an output terminal 410, which is an example of the first output terminal of the present invention, and another output of the coordinate converter 409 is connected to an output terminal 411, which is an example of the second output terminal of the present invention. The first vector quantizer of the present invention corresponds to the coordinate converter 407, the scalar quantizer 408 and the coordinate converter 409.

The operation of this circuit will be described. I data, which is an example of the first data of the present invention, and Q data, which is an example of the second data of the present invention, are respectively input through the input terminals 401 and 402. The I data input through the input terminal 401 is supplied to the scalar integrator 405 via the scalar subtracter 403, integrated by the scalar integrator 405, and input to the coordinate converter 407. The Q data input through the input terminal 402 undergoes the same processing before being input to the coordinate converter 407 as the other input to the same. The coordinate converter 407 performs conversion from the orthogonal coordinate system to a polar coordinate system (amplitude, phase). That is, if outputs from the scalar integrators 405 and 406 are I2 and Q2, respectively, data I2 and data Q2 are converted into data M and θ on the basis of (equation 1) and (equation 2). M is the magnitude (amplitude) of I2 and Q2 expressed by $$M=(I2^2+Q2^2)^{1/2} \quad \text{[Equation 1]}$$

and θ is an angle formed between I2 and Q2 as expressed by $$\theta=\text{Arctan}(Q2/I2) \quad \text{[Equation 2]}$$

Amplitude data output from the coordinate converter 407 is input to the scalar quantizer 408. The scalar quantizer 408 quantizes the input signal. More specifically, the scalar quantizer 408 outputs "a", which is an example of the predetermined value of the present invention, when the input signal is equal to or larger than the predetermined value "a". The scalar quantizer 408 outputs 0 when the input signal is smaller than the predetermined value "a". The output from the scalar quantizer 408 is input to the coordinate converter 409. Phase data output from the coordinate converter 407 is input to the coordinate converter 409 as the other input to the same. The coordinate converter 409 converts the data in the polar coordinate system into data in the orthogonal coordinate system. That is, the coordinate converter 409 converts the input amplitude data and phase data into data in the orthogonal coordinate system: I' data, which is an example of the third data of the present invention, and Q' data, which is an example of the fourth data of the present invention. Outputs from the coordinate converter 409 are fed back to the scalar subtracters 403 and 404. That is, the I' data is input to the scalar subtracter 403 through the second input terminal 812, and the Q' data is input to the scalar subtracter 403 through the second input terminal 814. The scalar subtracter 403 performs an operation to subtract the I' data output from the coordinate converter 409 from the data I input through the input terminal 401. Similarly, the scalar subtracter 404 performs an operation to subtract the Q' data output from the coordinate converter 409 from the data Q input through the input terminal 402.

Two data items I' and Q' output from the coordinate converter 409 are respectively output through the output terminals 410 and 411. The two data items I' and Q' output through the output terminals 410 and 411 are signals having a magnitude of "a" or 0 and suitable for realizing a high-efficiency transmitter.

While an example of binary quantization has been described, quantization by any value may be performed. For example, quantization by three values 0, a, and b (0<a<b; a, b: a real number) may be performed. In such a case, the scalar quantizer 408 outputs "b" when the input is equal to or larger than "b", outputs "a" when the input is equal to or larger than "a" and smaller than "b", and outputs 0 when the input is smaller than "a".

Figure 6:
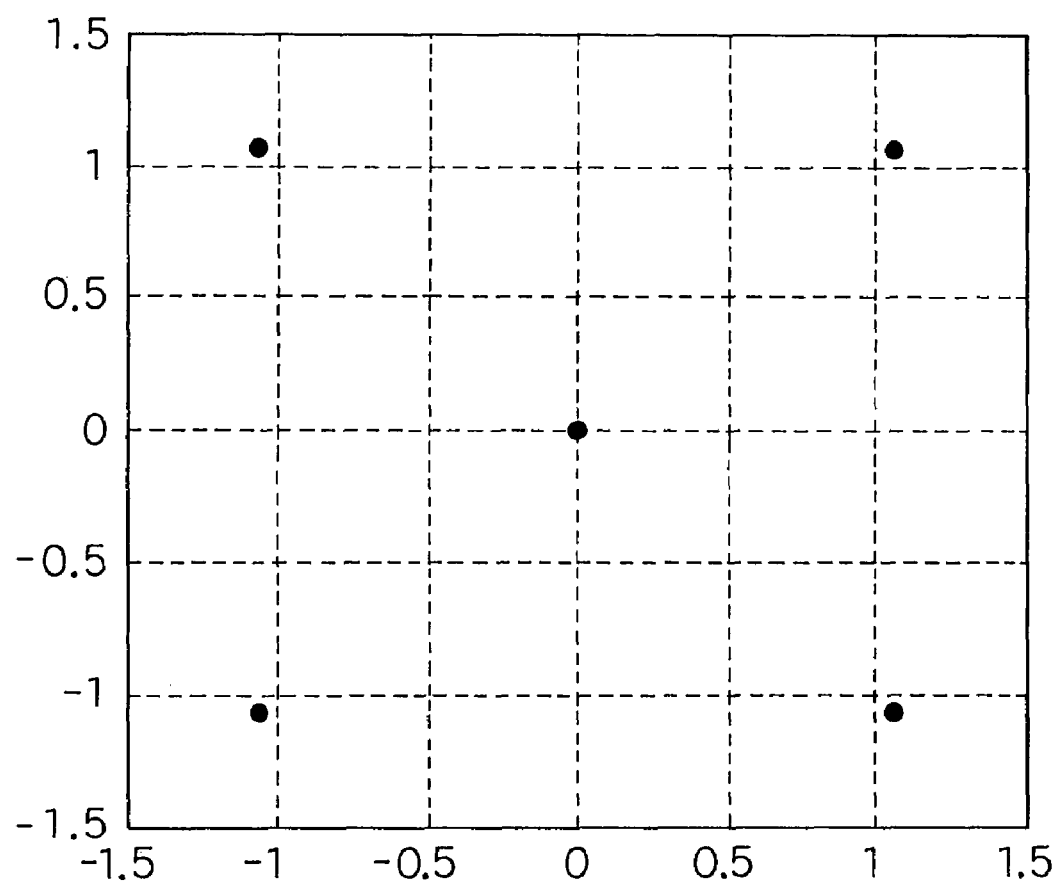
FIG. 6 is a diagram showing output signals from the data converter in Embodiment 1 of the present invention.

Quantization may also be performed with respect to phase. For example, while a case in which the phase of the output vector from the vector quantizer 104 is the same as the phase of the input vector has been described by way of example, the phase of the output vector may be quantized at several points according to the phase of the input vector. For example, the phase may be quantized at four points of 45°, 135°, −45°, and −135°. For example, quantization may be performed with reference to a closest phase point of the vector input to the vector quantizer. That is, a phase of 45° is output when the phase of the input vector is 10°, and a phase of 135° is output when the phase of the input vector is 120°. If the outputs when this operation is performed is I' data and Q' data, the relationship between the I' data and the Q' data is as shown in FIG. 6, in which the abscissa represents the I' data and the ordinate represents the Q' data.

In a case where quantization with respect to phase is also performed, phase quantization may be performed in such a manner that the phase output from the coordinate converter 407 shown in FIG. 5 is quantized by being input to a scalar quantizer (not shown) and the quantization result from this quantizer is input to the coordinate converter 409. In such a case, the scalar quantizer for quantizing the phase is also included in the first vector quantizer of the present invention. The arrangement may alternatively be such that the phase output from the coordinate converter 407 is also input to the scalar quantizer 408 and the scalar quantizer 408 quantizes both the amplitude and the phase.

Description will next be made with reference to FIG. 7 of a case where a transmitter is formed by using this high-efficiency data converter for transmission. I data and Q data are generated in a data generator 701. The high-efficiency transmission data converter 702 converts the I data and the Q data into I' data and Q' data as described above. The I' data and the Q' data are input to a modulator 703 and modulated by the same. A signal output from the modulator 703 is amplified by an amplifier 704 that is an example of the amplifier of the present invention. Quantization noise in this signal is removed by a bandpass filter 705, which is an example of the bandpass filter of the present invention. Thereafter, the signal is transmitted from an antenna 706, which is an example of the antenna of the present invention. Since the I' data and the Q' data output from the high-efficiency transmission data converter 702 have a magnitude of "a" or 0, the output from the modulator 703 is such that a constant-envelope signal is switched on and off, as shown in FIG. 8. Therefore, even if the amplifier 704 is nonlinear, no intermodulation distortion occurs. Consequently, linearity is not required of the amplifier 704 and the amplifier 704 can operate in the vicinity of a saturation point of its amplification characteristic and is therefore capable of high-efficiency operation.

Figure 9B:
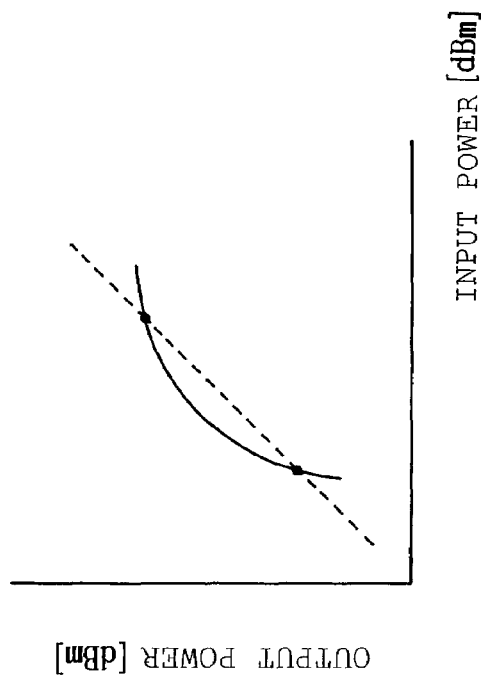
FIG. 9(b) is another diagram for explaining the operation of the transmitter using the data converter in Embodiment 1 of the present invention.
Figure 9A:
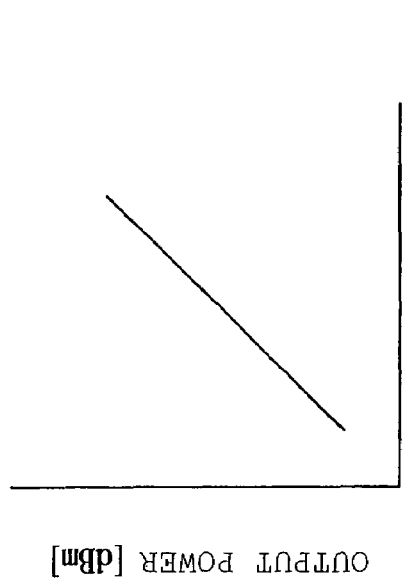
FIG. 9(a) is a diagram for explaining the operation of the transmitter using the data converter in Embodiment 1 of the present invention.
Figure 9C:
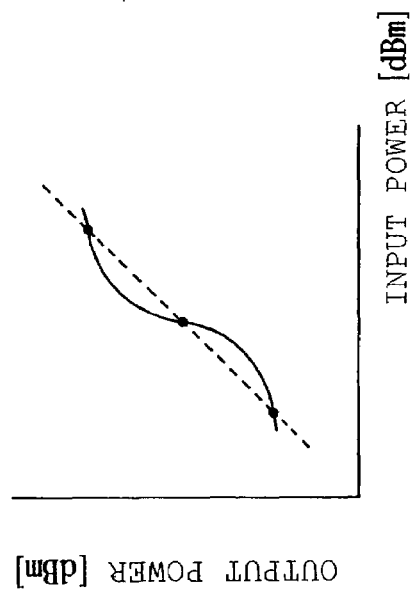
FIG. 9(c) is another diagram for explaining the operation of the transmitter using the data converter in Embodiment 1 of the present invention.

The description has been made by assuming that the magnitude of the signal vector output from the high-efficiency transmission data converter is one of two values, i.e., "a" and 0. However, even in a case where the magnitude of the signal vector is multivalued, the linearity required of the amplifier can be alleviated in comparison with that in the conventional art. Therefore an improvement in efficiency can be achieved. That is, in the conventional art, linearity through a wide power range has been required because the input power changes continuously (FIG. 9(*a*)). In the data converter of the present invention, linearity is not required of the amplifier when the amplitude of the signal vector from the data converter is two-valued. Further, in a case where the amplitude is multivalued, possible input power levels are discrete, as shown in FIG. 9(*c*) Therefore, no continuous linearity is required of the amplifier if the linearity of the input power value is maintained with respect to discrete amplitude values as indicated by the dotted line in FIG. 9 (*b*) or 9C.

For concrete explanation of this, a case will be considered in which the amplitude determined by the original I and Q data varies largely, for example, in a 20 dB range. In this case, it is necessary to ensure that the amplifier has linearity in the 20 dB range. On the other hand, in a case where the amplitude is quantized by three values: 0, 1, and 2, a change of 6 dB in amplitude occurs between operating points of the amplifier corresponding to 1 and 2. In this case, the linearity of the amplifier may be corrected at the points corresponding to the difference 6 dB (see FIG. 9(*b*)).

Figure 10:
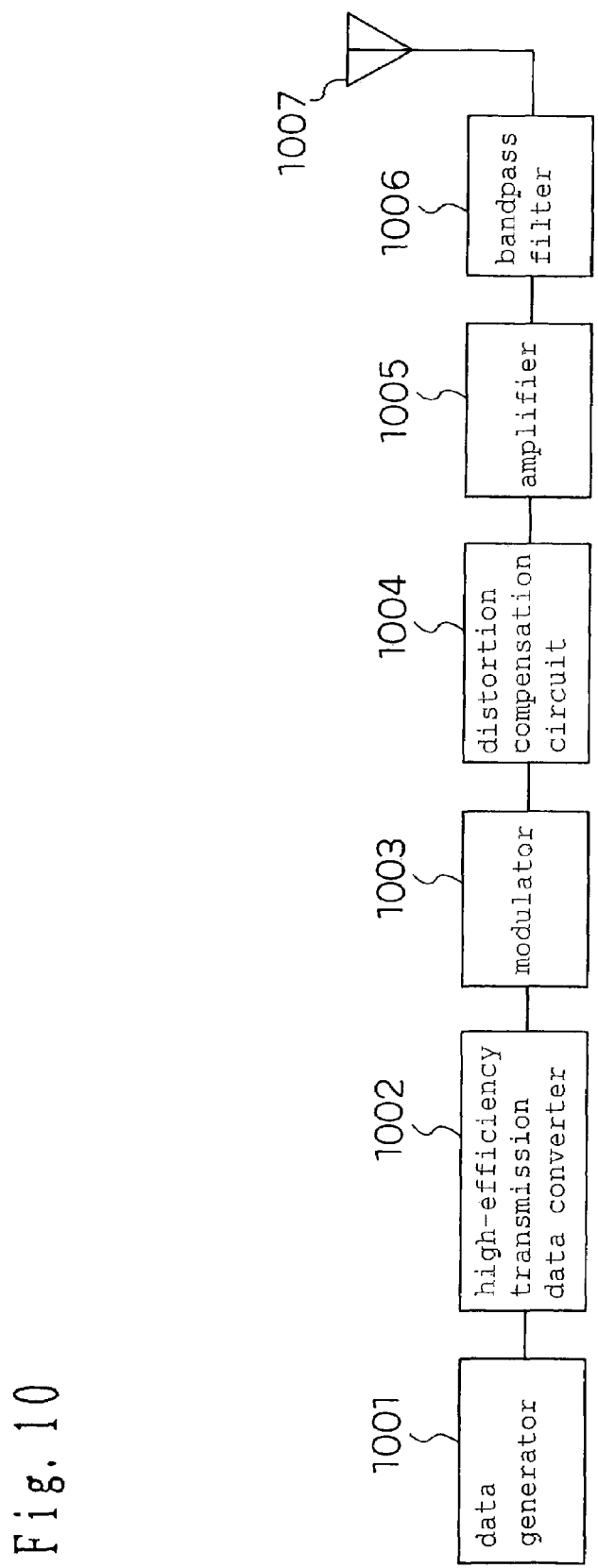
FIG. 10 is a block diagram showing the configuration of another transmitter using the data converter in Embodiment 1 of the present invention.

Also, nonlinearity of an amplifier 1005 may be compensated for. FIG. 10 shows an example of an arrangement for compensation. The arrangement shown in FIG. 10 differs from that shown in FIG. 7 in that a distortion compensation circuit 1004 is added in a stage followed by the amplifier 1005. The distortion compensation circuit 1004 is a circuit including an active element and having a distortion characteristic reverse to that of the amplifier 1005. That is, the distortion compensation circuit 1004 generates data for compensating for the nonlinearity of the amplifier 1005. Linear amplification can be achieved by combining the distortion compensation circuit 1004 and the amplifier 1005.

Figure 11:
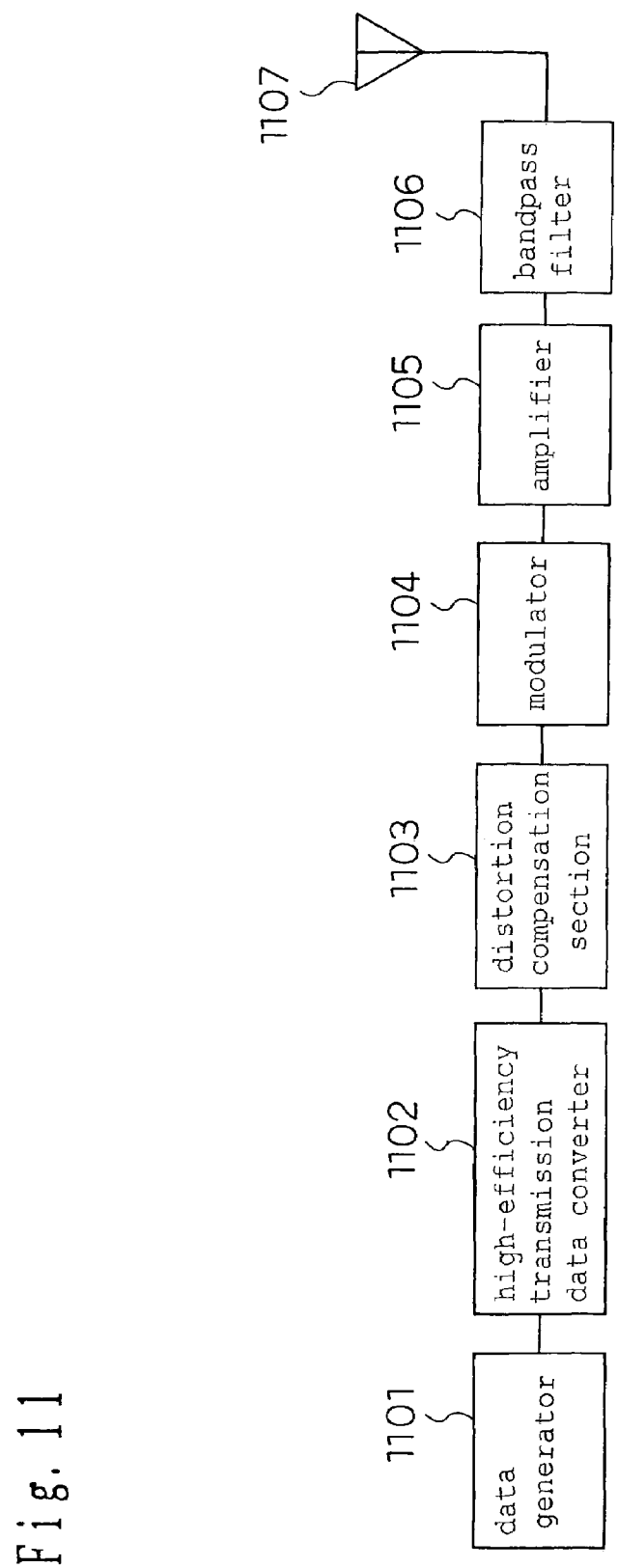
FIG. 11 is a block diagram showing the configuration of a further transmitter using the data converter in Embodiment 1 of the present invention.

FIG. 11 shows another example. A distortion compensation section 1103 is connected in a stage following a high-efficiency transmission data converter 1102. In the distortion compensation section 1103, digital signal processing is performed on a baseband signal to previously distort the signal so that the signal has a distortion characteristic reverse to a distortion caused in an amplifier 1105 in order to compensate for the distortion in the amplifier 1105. In this case, data is controlled with reference to a compensation table according to the magnitude of the envelope of the signal input to the amplifier 1105. Conventionally, the magnitudes of I and Q are finely divided discretely and a table is formed with respect to the finely divided values. Therefore a large table has been required. In contrast, in a case where the high-efficiency transmission data converter 1102 is used as shown in FIG. 11 and where the amplitude is quantized by three values, e.g., 0, a, and 2a, a table may be formed only with respect to "a" and "2a" in these values, thus greatly reducing the size of the distortion compensation table.

Figure 12:
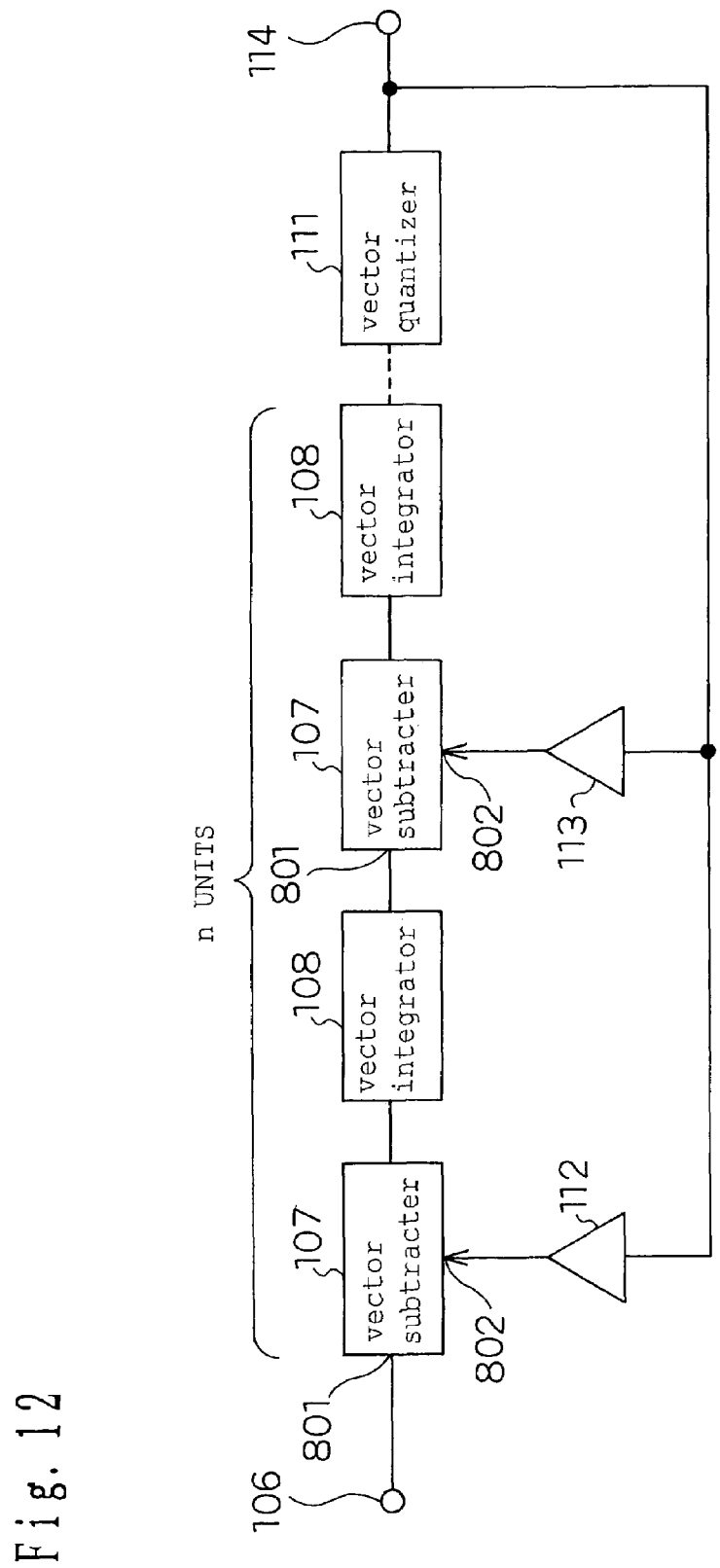
FIG. 12 is a diagram showing the configuration of another data converter in Embodiment 1 of the present invention.

A configuration of a higher order for a high-efficiency transmission data converter is conceivable. FIG. 12 shows an example of a configuration of the nth order.

Figure 30:
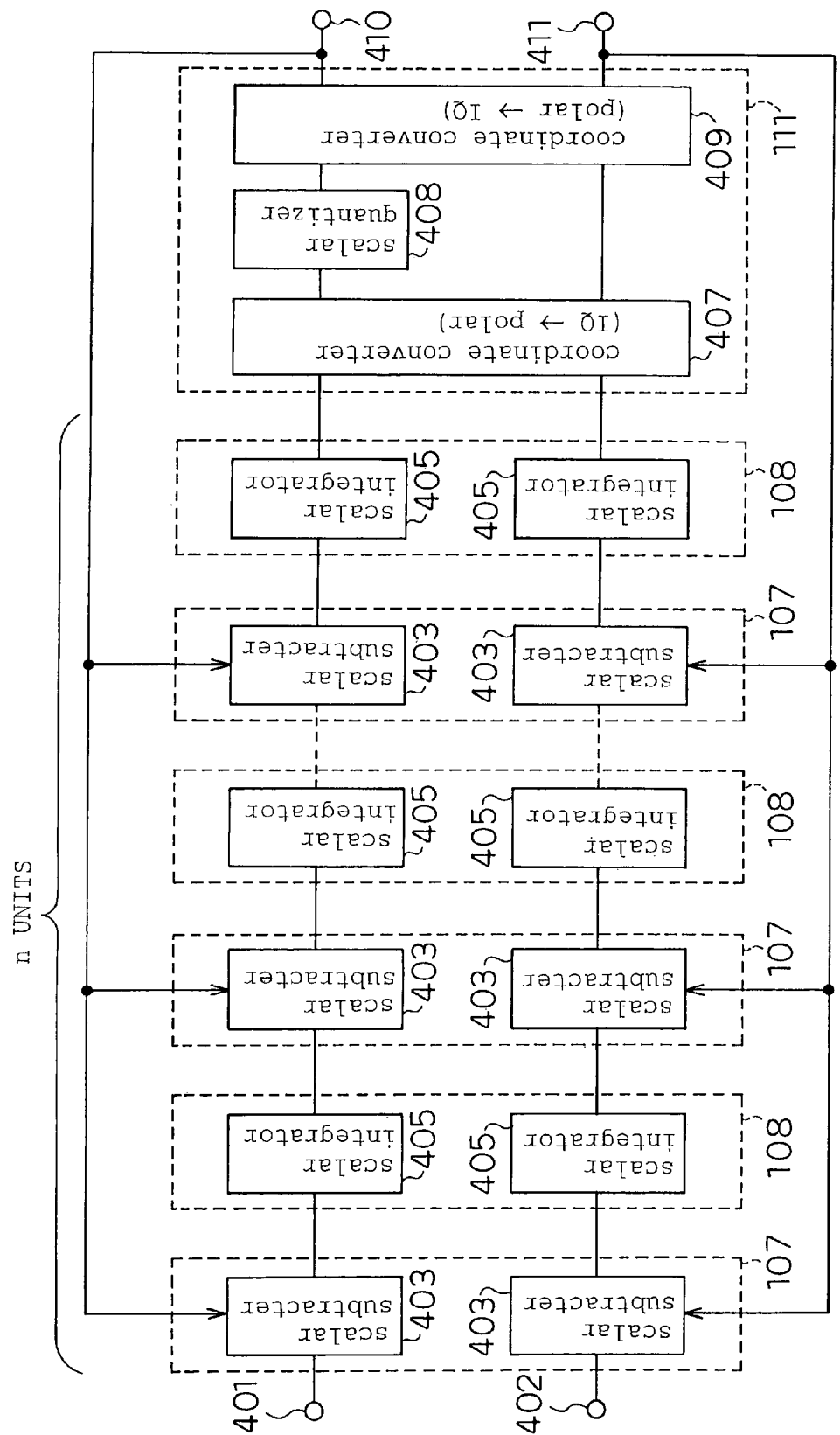
FIG. 30 is a diagram showing the configuration of a further data converter in Embodiment 1 of the present invention.

That is, a configuration described below may be used. There are provided an input terminal 106 through which I data and Q data, which are an example of parallel data forming a predetermined vector, are input, a computation circuit connected to the input terminal 106, a first vector quantizer, which is connected to the computation circuit, and which is an example of the first vector quantizer of the present invention, and an output terminal 114 which is connected to the vector quantizer. The computation circuit is formed by connecting n number of unit circuits each formed of a vector subtracter 107 having a first input terminal 801 and a second input terminal 802 and a vector integrator 108 connected to an output side of the vector subtracter 107. An output at the output terminal 114 is input to each of the vector subtracters 107 in the unit circuits through the second input terminal 802. The input terminal 106 is connected to the first input terminal of the vector subtracter 107 in the first unit circuit. Between the unit circuits, an output terminal of the vector integrator 108 and the first input terminal of the vector subtracter 107 are connected to each other. FIG. 30 shows a concrete example of such a high-order configuration. If such a high-order configuration is used, noise close to a frequency of a desired wave can be reduced, as in an ordinary delta-sigma modulator (see, for example, S. R. Norsworthy, R. Schreiter, G. C. Temes, "Delta-Sigma Data Converters Theory, Design, and Simulation" (U.S.) IEEE Press, 1997, p.14).

Typically, signal processing ending in the data converter is realized as digital signal processing, and modulation is performed by the modulator after D/A conversion. If signal processing to the modulator output is realized as digital signal processing, the number of analog parts can be reduced.

In the case of a multimode transmitter which transmits a plurality of modulated waves, the noise level can be minimized with respect to each of different kinds of modulation by changing the predetermined value "a" according to the kind of modulation. That is, if a peak due to modulation is high, the value of "a" is increased. If the peak is low, the value of "a" is reduced.

In the case of a transmitter which transmits a plurality of signals of different frequencies, adaptation to the plurality of signals of different frequencies can be achieved by changing the band (pass frequency) of a bandpass filter connected to an output of an amplifier according to the transmission frequency.

Figure 13:
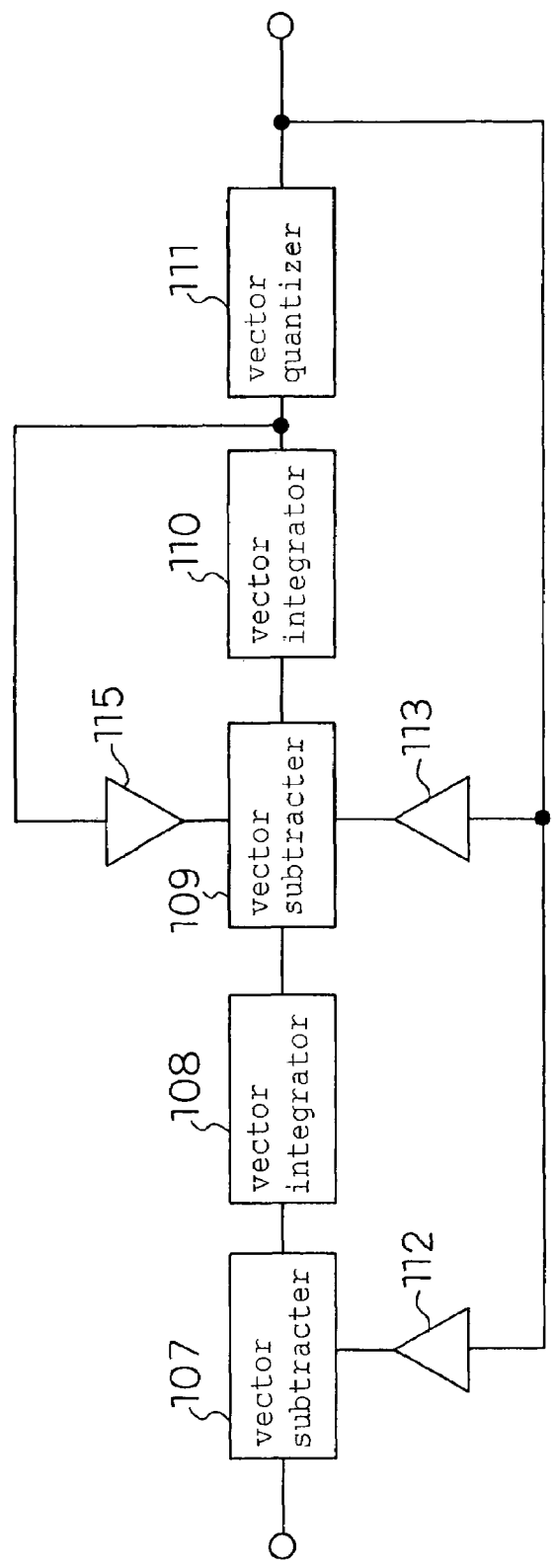
FIG. 13 is a diagram showing the configuration of a further data converter in Embodiment 1 of the present invention.

In the configuration shown in FIG. 12, the output from the vector quantizer 111 is input to each of the subtracter. Alternatively, the output from each integrator may be input to the corresponding subtracter. For example, as shown in FIG. 13, the output from an integrator 110 may be input to a vector subtracter 109 by being amplified or attenuated to a scalar multiple by an amplifier 115, and the output from the vector quantizer 111 may be input as a feedback to one or both of vector subtracters 107 and 109.

Figure 7:
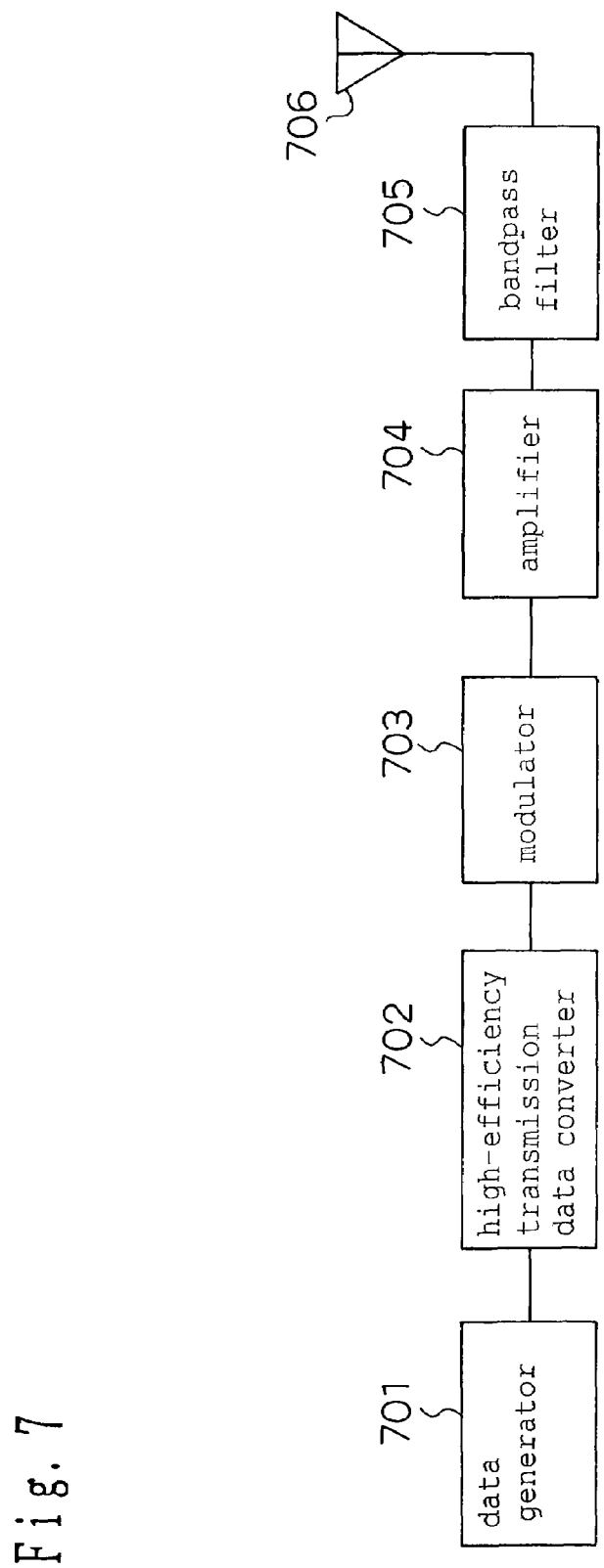
FIG. 7 is a block diagram showing the configuration of a transmitter using the data converter in Embodiment 1 of the present invention.
Figure 8:
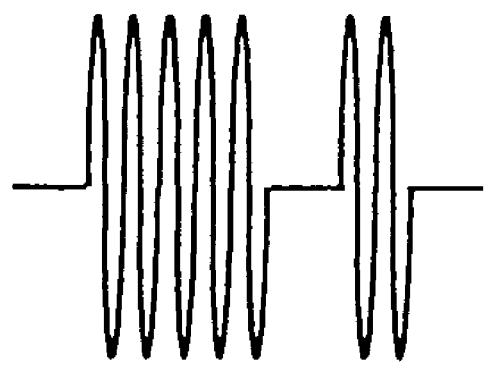
FIG. 8 is a diagram for explaining the operation of the transmitter using the data converter in Embodiment 1 of the present invention.
Figure 29:
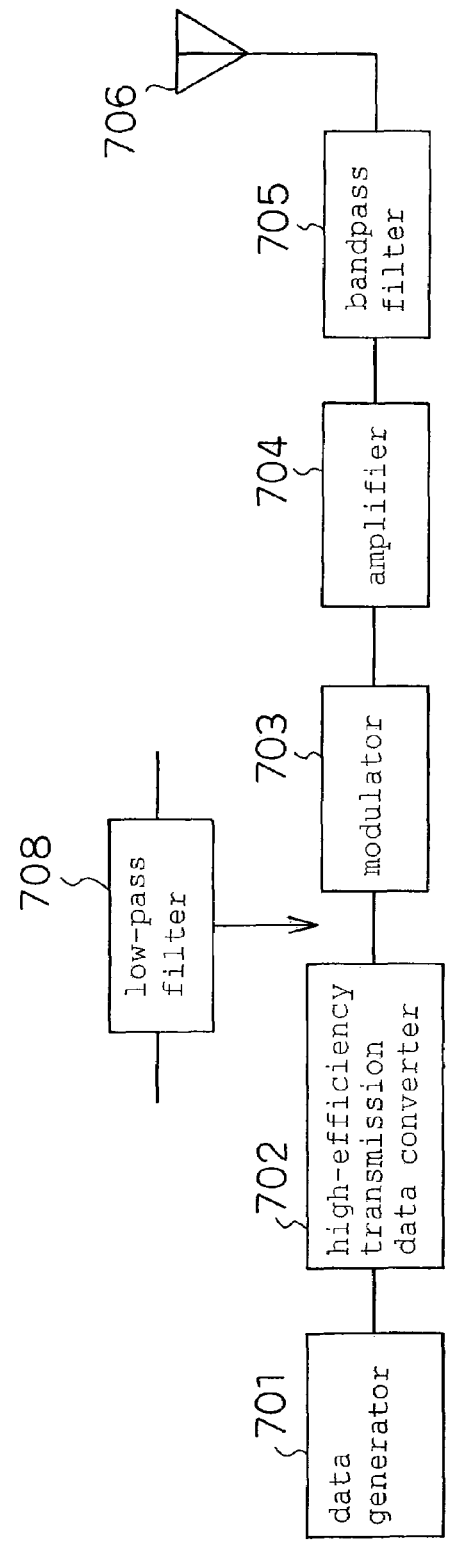
FIG. 29 is a diagram showing the configuration of a transmitter using the data converter in Embodiment 1 of the present invention.

Also, in the transmitter shown in FIG. 7, a low-pass filter 708 may be inserted between the high-efficiency transmission data converter 702 and the modulator 703, as shown in FIG. 29. Since quantization noise occurs through a wide frequency range, if unnecessary signals are suppressed by performing band limitation before input to the modulator 703, the strict specifications of the bandpass filter 705 following the amplifier 704 can be alleviated. In such a case, since there is a need to secure data from direct current to half of the clock frequency in the data output from the high-efficiency transmission data converter 702, the cutoff frequency of the low-pass filter 708 may be set higher than this frequency.

While no delay element has been mentioned with respect to this embodiment, a delay element may be inserted between the components. For example, in the configuration shown in FIG. 1, a delay element may be inserted in one of the paths from the vector subtracter 102 to the vector integrator 103, the path from the vector integrator 103 to the vector quantizer 104, and the path from the vector quantizer 104 to the vector subtracter 102.

Embodiment 2

Figure 14:
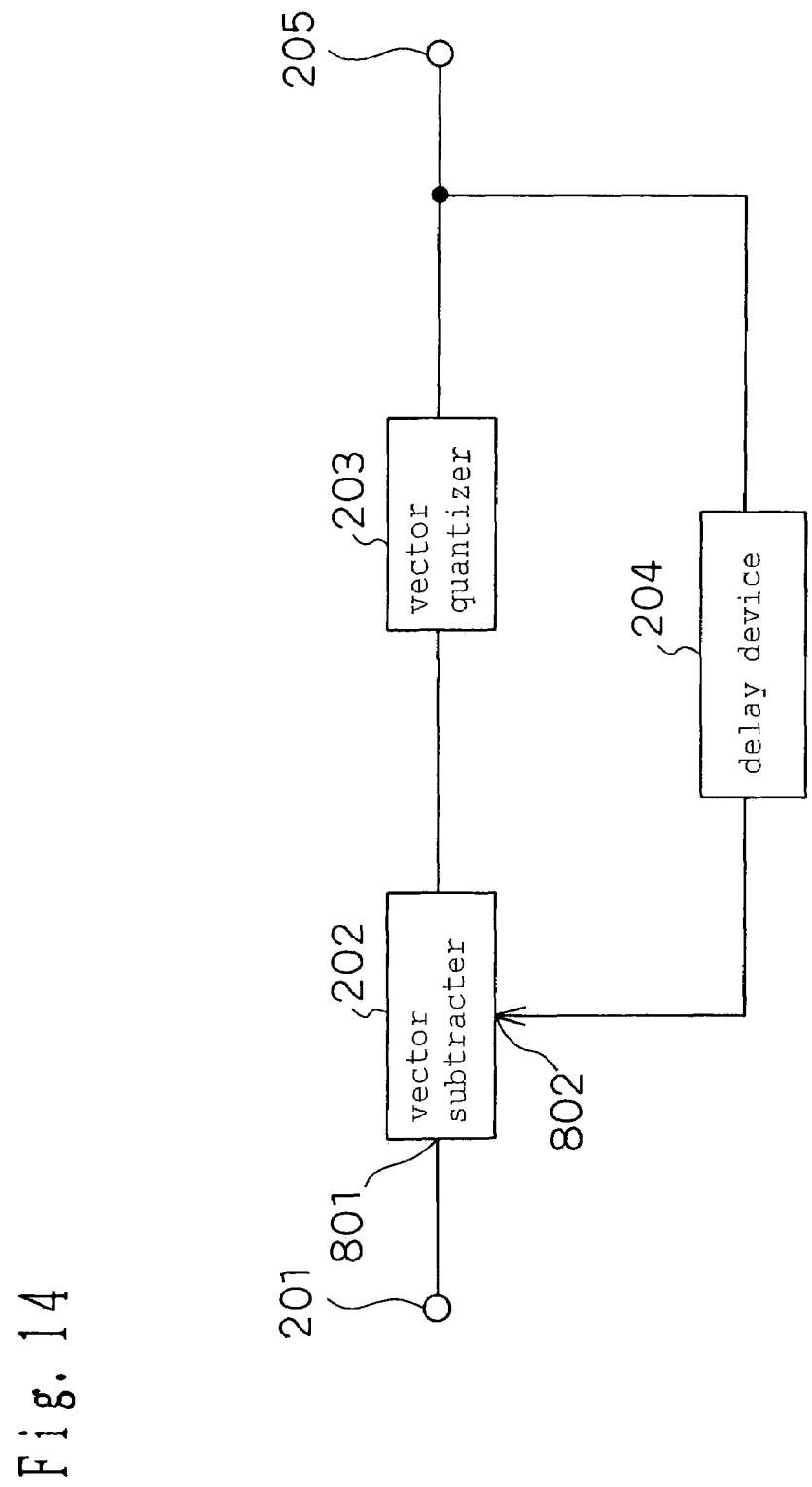
FIG. 14 is a diagram showing the configuration of a data converter in Embodiment 2 of the present invention.

Embodiment 2 of the present invention will be described with reference to FIG. 14. Referring to FIG. 14, a first input terminal 801 of a vector subtracter 202, which is another example of the first vector subtracter of the present invention, is connected to an input terminal 201, which is another example of the parallel data input terminal of the present invention. An output of the vector subtracter 202 is connected to a vector quantizer 203, which is an example of the second vector quantizer of the present invention. An output of the vector quantizer 203 is connected to the second input terminal 802 of the vector subtracter 202 through a delay device 204. An output terminal 205 is connected to the output of the vector quantizer 203.

The operation of this circuit will be described. A case in which the vector quantizer 203 performs quantization with respect to the magnitude of a vector will first be considered. Parallel data is input through the input terminal 201. This parallel data is referred to as I data and Q data. This data is input to the vector quantizer 203 through the vector subtracter 202. A vector of a predetermined amplitude "a" is output from the vector quantizer 203. There is no particular limitation to the phase of this vector. For example, it is set equal to the phase of the input parallel data. An output from the vector quantizer 203 is delayed by an amount of time corresponding to one or several clock pulses by the delay device 204, and is thereafter input to the vector subtracter 202 through the second input terminal 802. The amount of delay maybe the period of one clock pulse, for example. The vector subtracter 202 subtracts the data input from the delay device 204 from the data input through the input terminal 201. The output terminal 205 is connected to the output of the vector quantizer 203, and parallel data is output through the output terminal 205.

Figure 15:
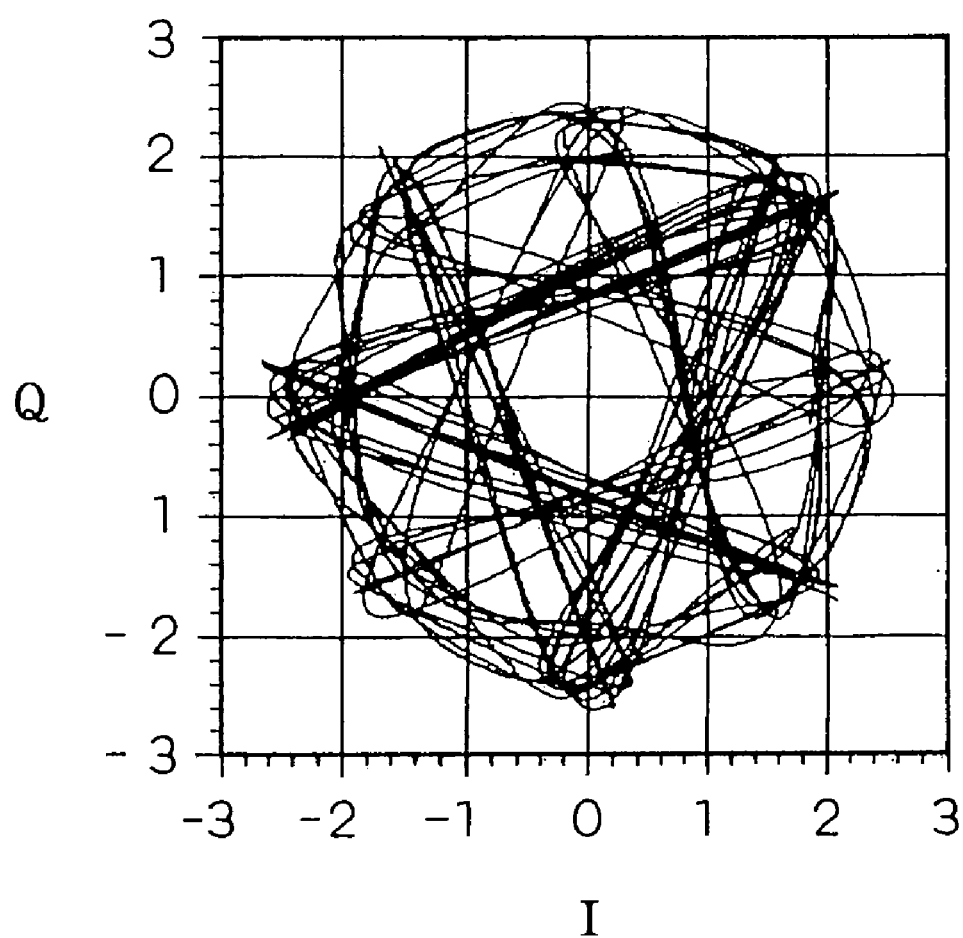
FIG. 15 is a diagram showing input signals to the data converter in Embodiment 2 of the present invention.
Figure 16:
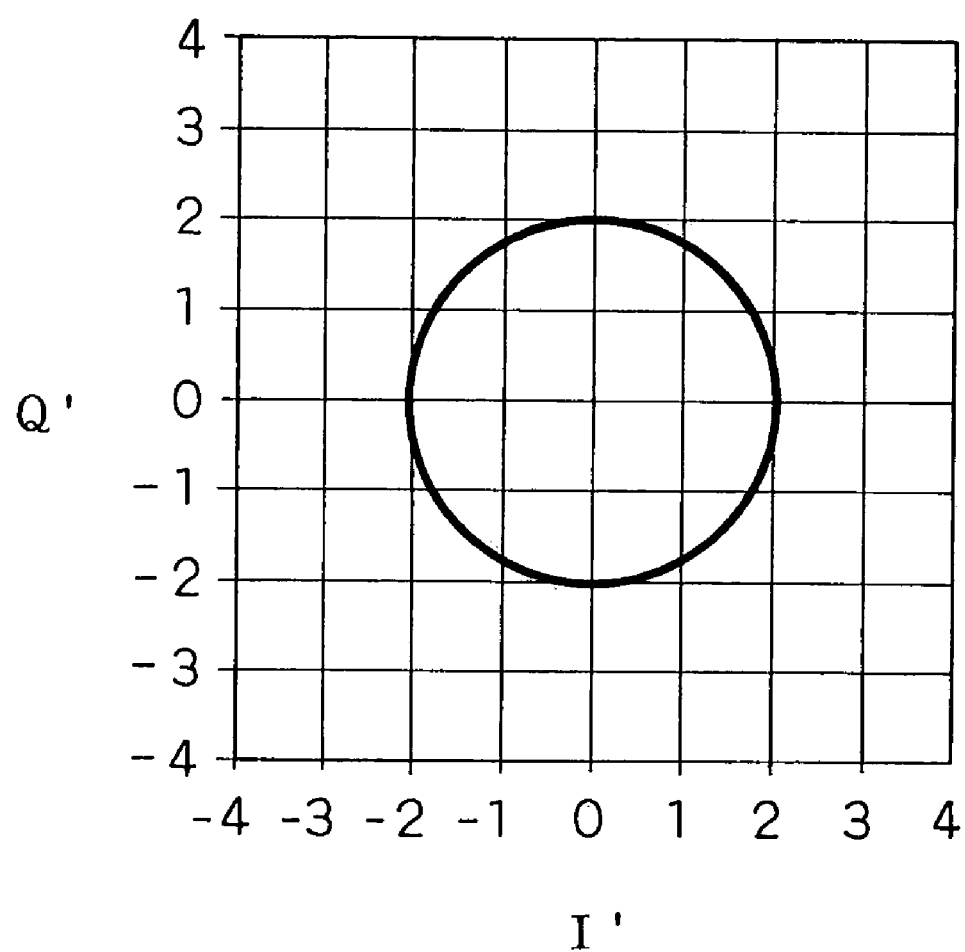
FIG. 16 is a diagram showing output signals from the data converter in Embodiment 2 of the present invention.

FIG. 15 shows the relationship between the parallel data I and Q input through the input terminal 201, the abscissa representing the I data, the ordinate representing the Q data. FIG. 16 shows the relationship between I' data and Q' data which are output as parallel data through the output terminal 205, the abscissa representing the I' data, the ordinate representing the Q' data.

Figure 17:
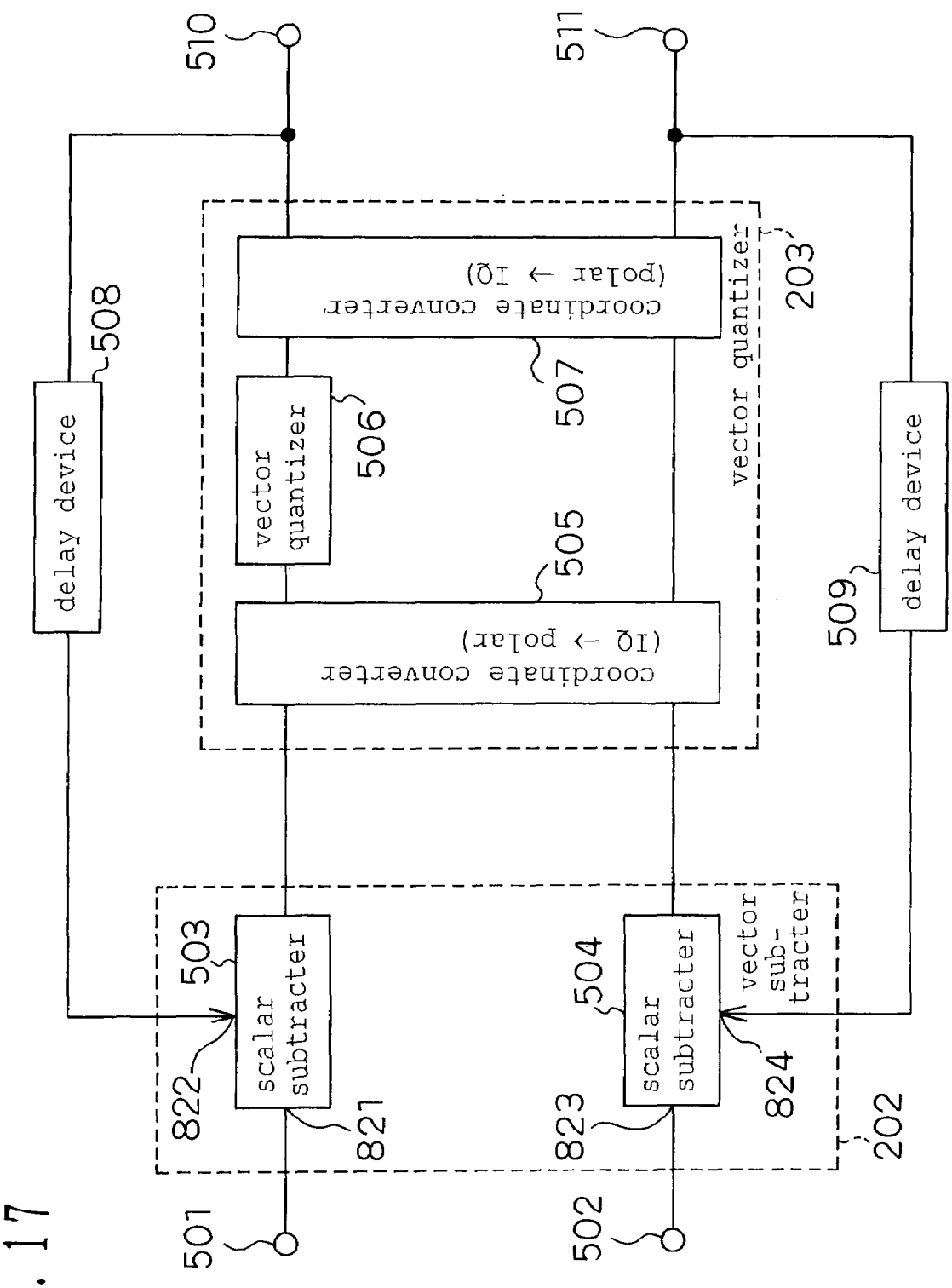
FIG. 17 is a block diagram showing the configuration of a concrete example of the data converter in Embodiment 2 of the present invention.

An example of a circuit by which this data conversion is actually performed will be described with reference to FIG. 17. Referring to FIG. 17, a first input terminal 821 of a scalar subtracter 503, which is an example of the first scalar subtracter of the present invention, is connected to an input terminal 501, and a first input terminal 823 of a scalar subtracter 504, which is an example of the second scalar subtracter of the present invention, is connected to an input terminal 502. Outputs of the scalar subtracters 503 and 504 for data in an orthogonal coordinate system are connected to two input terminals of a coordinate converter 505, which is an example of the first coordinate converter of the present invention. An output of a scalar quantizer 506, which is an example of the second scalar quantizer of the present invention, and an output of the coordinate converter 505 are connected to two input terminals of a coordinate converter 507, which is an example of the second coordinate converter of the present invention. One of two outputs of the coordinate converter 507 is connected to a second input terminal 822 of the scalar subtracter 503 through a delay device 508. The other of the two outputs of the coordinate converter 507 is connected to a second input terminal 824 of the scalar subtracter 504 through a delay device 509. Also, the two outputs of the coordinate converter 507 are respectively connected to output terminals 510 and 511. The output terminal 510 is an example of the first output terminal of the present invention, and the output terminal 511 is an example of the second output terminal of the present invention. The second vector quantizer of the present invention corresponds to the coordinate converter 505, the scalar quantizer 506 and the coordinate converter 507.

The operation of this circuit will be described. I data and Q data are respectively input through the input terminals 501 and 502. The I data input through the input terminal 501 is supplied to the coordinate converter 505 via the scalar subtracter 503. The Q data input through the input terminal 502 undergoes the similar processing and is input as the other input to the coordinate converter 505.

The coordinate converter 505 performs conversion from the orthogonal coordinate system to a polar coordinate system (amplitude, phase). That is, if outputs from the scalar integrators 503 and 504 are I2 and Q2, respectively, data I2 and data Q2 are converted into data M and θ on the basis of (equation 3) and (equation 4). M is the magnitude (amplitude) of I2 and Q2 expressed by $$M = (I2^2 + Q2^2)^{1/2} \qquad \text{[Equation 3]}$$

and θ is an angle formed between I2 and Q2 as expressed by $$\theta = \text{Arctan}(Q2/I2) \quad \text{[Equation 4]}$$

Amplitude data M and phase data θ are output from the coordinate converter 505. The scalar quantizer 506 outputs the constant value "a". The output from the scalar quantizer 506 is input to the coordinate converter 507. The phase data output from the coordinate converter 505 is input as the other input to the coordinate converter 507. The coordinate converter 507 converts the data in the polar coordinate system into data in the orthogonal coordinate system. That is, the constant value "a" corresponding to the input amplitude data and the phase data θ are converted into data in the orthogonal coordinate system: I' data, which is an example of the third data of the present invention, and Q' data, which is an example of the fourth data of the present invention.

Outputs from the coordinate converter 507 are fed back to the scalar subtracters 503 and 504 through the delay devices 508 and 509.

The scalar subtracter 503 performs an operation to subtract from the data input through the input terminal 501 the I' data output from the coordinate converter 507 and delayed. Similarly, the scalar subtracter 504 performs an operation to subtract from the data input through the input terminal 502 the Q' data output from the coordinate converter 507 and delayed. Two data items I' and Q' output from the coordinate converter 507 are respectively output through the output terminals 510 and 511.

While an example of quantization by one value has been described, quantization by any value may be performed. For example, quantization by two values "a" and "b" (a<b) may be performed. In such a case, the magnitude of the output vector from the vector quantizer 203 may be set to "a" when the magnitude of the vector input to the vector quantizer 203 is smaller than the middle value between "a" and "b", and set to "b" when the magnitude of the input vector is equal to or larger than the middle value.

Figure 18:
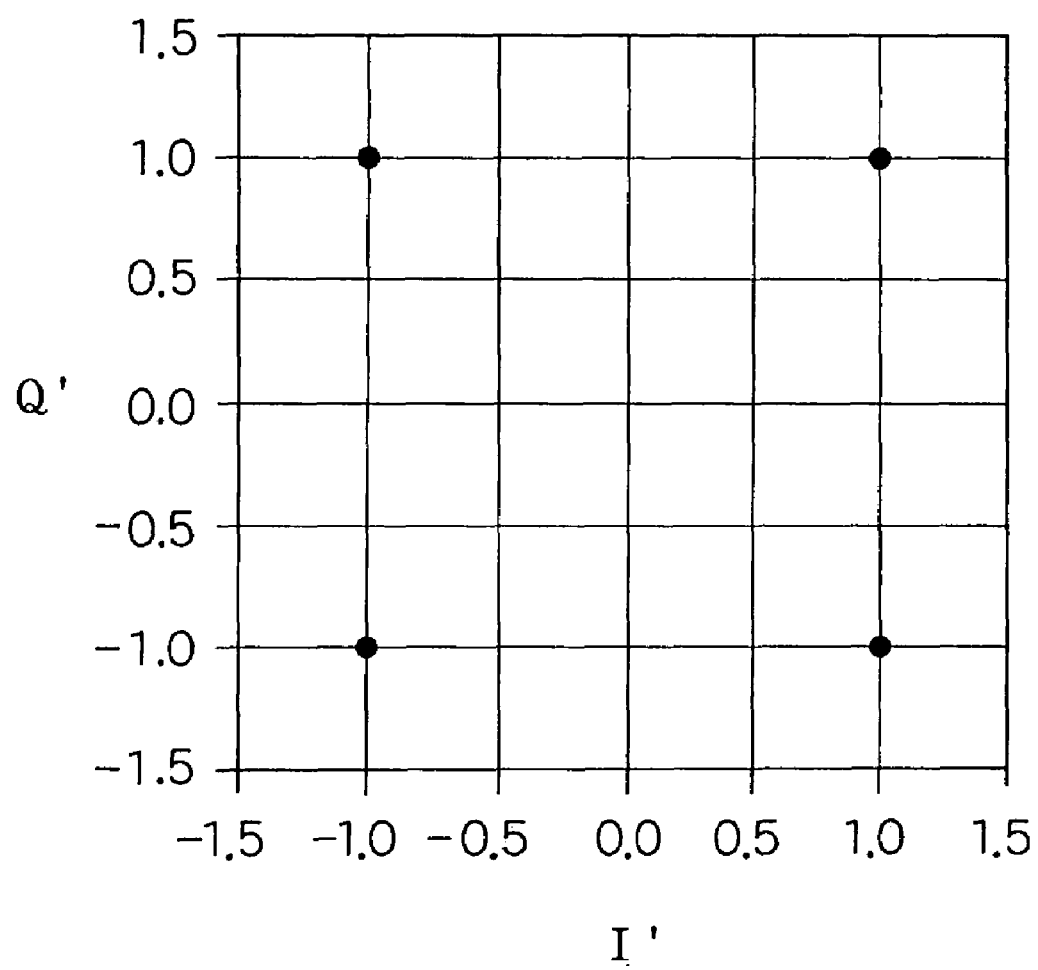
FIG. 18 is a diagram showing output signals from the data converter in Embodiment 2 of the present invention.

Quantization may also be performed with respect to phase. For example, while a case in which the phase of the output vector from the vector quantizer 203 is the same as the phase of the input vector has been described by way of example, the phase of the output vector may be quantized at several points according to the phase of the input vector. For example, the phase may be quantized at four points of 45°, 135°, −45°, and −135°. For example, quantization may be performed with reference to a closest phase point of the vector input to the vector quantizer. That is, a phase of 45° is output when the phase of the input vector is 10°, and a phase of 135° is output when the phase of the input vector is 120°. If the outputs when this operation is performed is I' data and Q' data, the relationship between the I' data and the Q' data is as shown in FIG. 18, in which the abscissa represents the I' data and the ordinate represents the Q' data.

In a case where quantization with respect to phase is also performed, phase quantization may be performed in such a manner that the phase output from the coordinate converter 505 shown in FIG. 17 is quantized by being input to a scalar quantizer (not shown) and the quantization result from this quantizer is input to the coordinate converter 507. In such a case, the scalar quantizer for quantizing the phase is also included in the second vector quantizer of the present invention. The arrangement may alternatively be such that the phase output from the coordinate converter 505 is also input to the scalar quantizer 506 and the scalar quantizer 506 quantizes both the amplitude and the phase.

Figure 19:
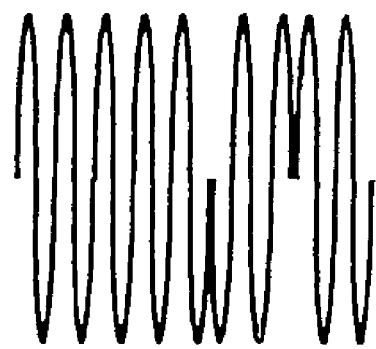
FIG. 19 is a diagram for explaining the operation of a transmitter using the data converter in Embodiment 2 of the present invention.

Description will next be made of a case where a transmitter is formed by using this data converter. The configuration of this transmitter is the same as that in Embodiment 1, as shown in FIG. 7. However, the output waveform with respect to time is an angle-modulated wave of a constant envelope, as shown in FIG. 19 when the amplitude is quantized by one value. Therefore, even if the amplifier 704 is nonlinear, no intermodulation distortion occurs. Consequently, linearity is not required of the amplifier 704 and the amplifier 704 can operate in the vicinity of a saturation point of its amplification characteristic, thus enabling high-efficiency operation.

Embodiment 3

Figure 20:
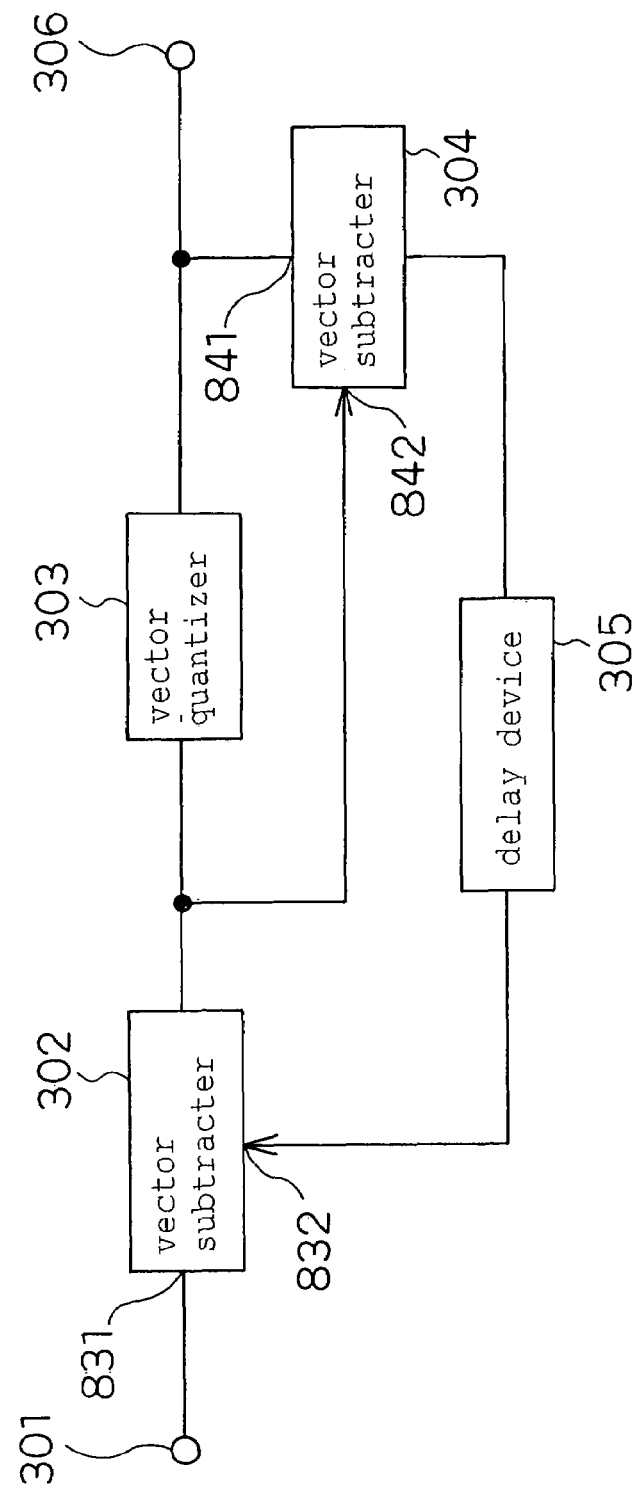
FIG. 20 is a diagram showing the configuration of a data converter in Embodiment 3 of the present invention.

Embodiment 3 of the present invention will be described with reference to FIG. 20. Referring to FIG. 20, a first input terminal 831 of a vector subtracter 302, which is another example of the first vector subtracter of the present invention, is connected to an input terminal 301, which is another example of the parallel data input terminal of the present invention. An output of the vector subtracter 302 is connected to a vector quantizer 303, which is another example of the second vector quantizer of the present invention. An output of the vector quantizer 303 is connected to a vector subtracter 304, which is an example of the second vector subtracter of the present invention. The output of the vector subtracter 302 is connected to a second input terminal 842 of the vector subtracter 304. An output of the vector subtracter 304 is connected to a second input terminal 832 of the vector subtracter 302 through a delay device 305. An output terminal 306 is connected to the output of the vector quantizer 303.

The operation of this circuit will be described. Parallel data is input through the input terminal 301. This parallel data is referred to as I data and Q data. This data is input to the vector quantizer 303 through the vector subtracter 302. A vector of a predetermined amplitude "a" is output from the vector quantizer 303. The phase of this vector is set equal to the phase formed by the input parallel data I and Q. An output from the vector quantizer 303 is input to the vector subtracter 304 through the first input terminal 841. An output from the vector subtracter 302 is input to the vector subtracter 304 through the second input terminal 842 which is the other input of the same.

The vector subtracter 304 performs an operation to subtract the output from the vector subtracter 302 from the output from the vector quantizer 303. An output from the vector subtracter 304 is delayed by an amount of time corresponding to one clock pulse by the delay device 305 and is thereafter input to the vector subtracter 302 through the second input terminal 832 which is the other input of the same. The vector subtracter 302 subtracts the data output from the delay device 305 from the data input through the input terminal 301. The output terminal 306 is connected to the output of the vector quantizer 303, and parallel data is output through the output terminal 306.

Figure 21:
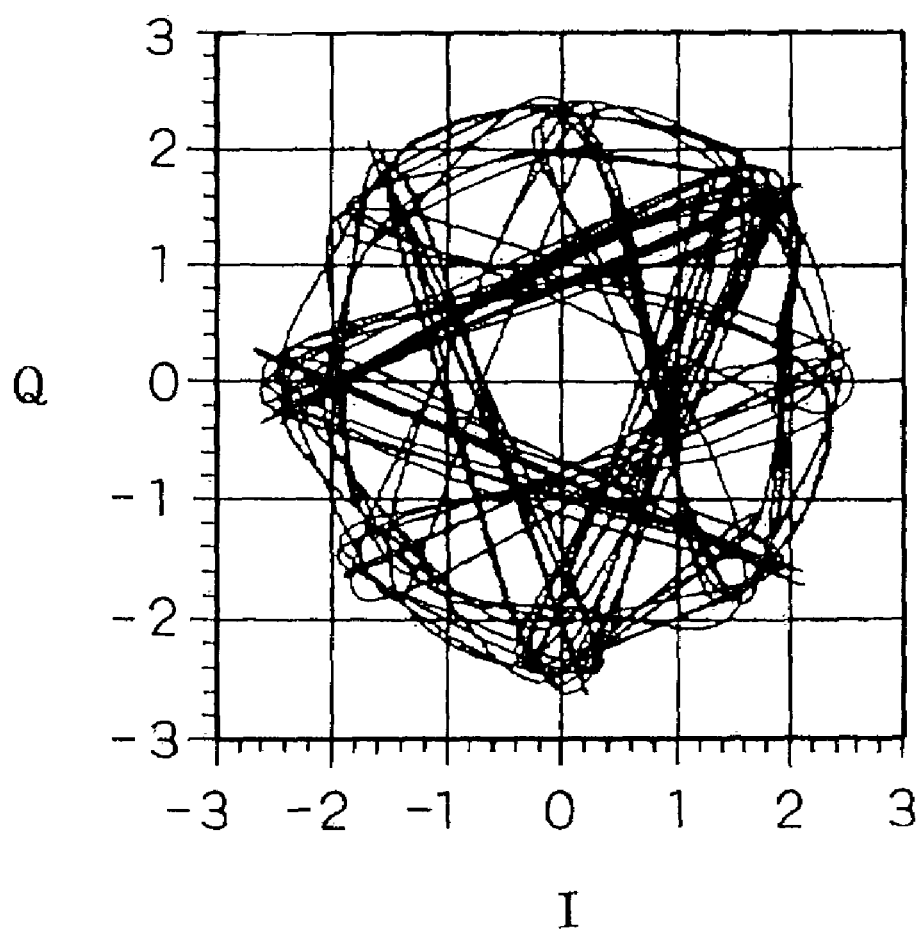
FIG. 21 is a diagram showing input signals to the data converter in Embodiment 3 of the present invention.
Figure 22:
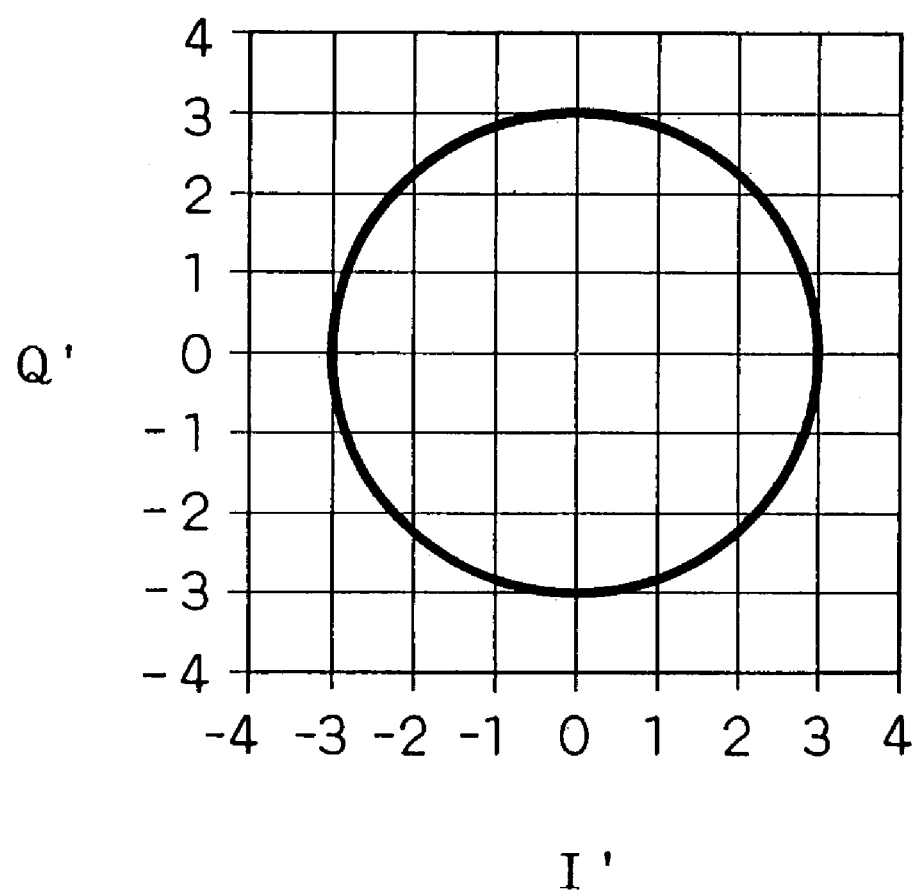
FIG. 22 is a diagram showing output signals from the data converter in Embodiment 3 of the present invention.

FIG. 21 shows the relationship between the parallel data I and Q input through the input terminal 301, the abscissa representing the I data, the ordinate representing the Q data. FIG. 22 shows the relationship between I' data and Q' data which are output as parallel data through the output terminal 306, the abscissa representing the I' data, the ordinate representing the Q' data.

Figure 23:
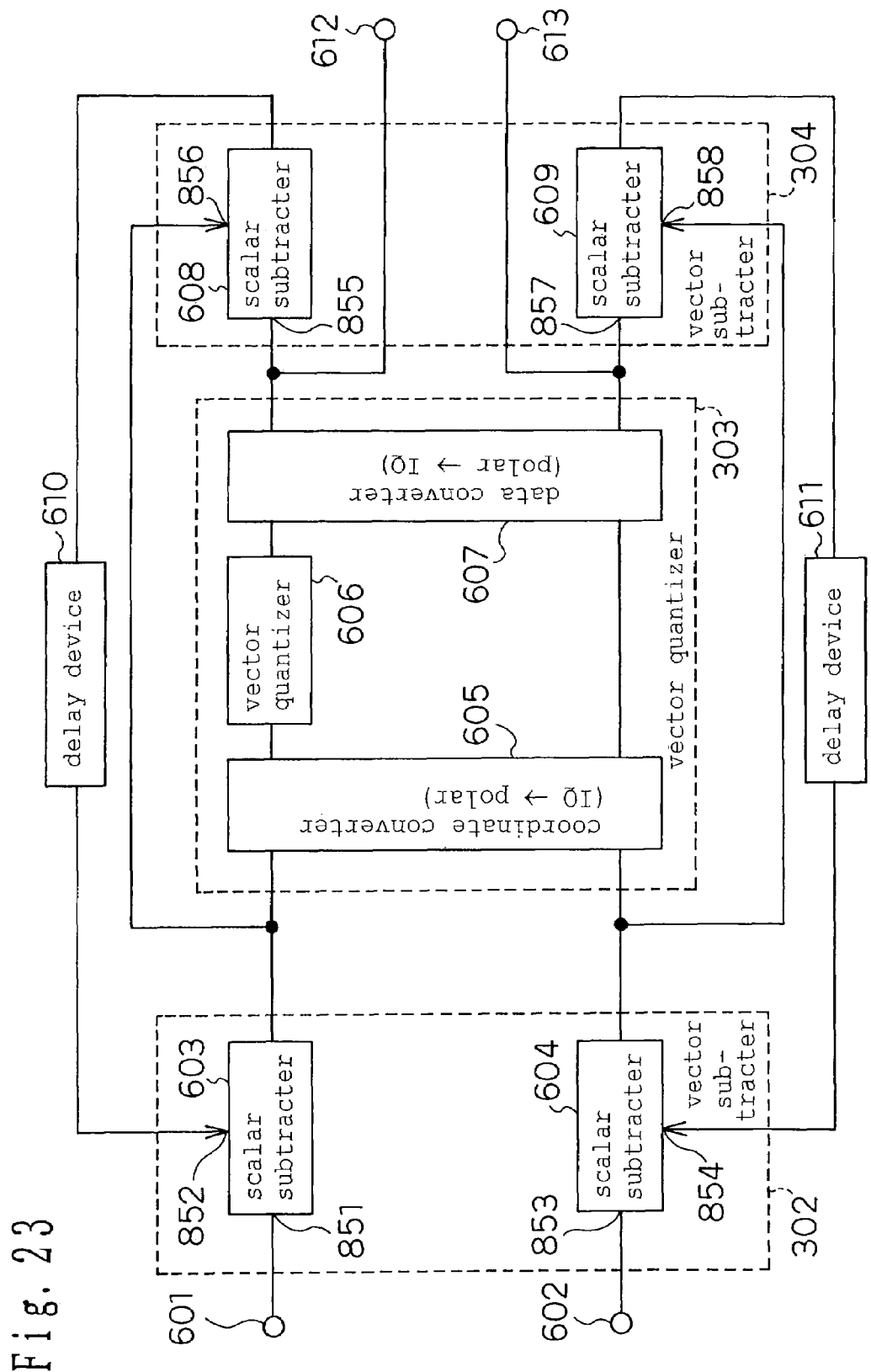
FIG. 23 is a block diagram showing the configuration of a concrete example of the data converter in Embodiment 3 of the present invention.

An example of a circuit by which this data conversion is actually performed will be described with reference to FIG. 23. Referring to FIG. 23, a scalar subtracter 603, which is an example of the first scalar subtracter of the present invention, is connected to an input terminal 601, and a scalar subtracter 604, which is an example of the second scalar subtracter of the present invention, is connected to an input terminal 602. Outputs of the scalar subtracters 603 and 604 are connected to two input terminals of a coordinate converter 605, which is an example of the first coordinate converter of the present invention. An output of a scalar quantizer 606, which is another example of the second scalar quantizer of the present invention, and a phase data output of the coordinate converter 605 are connected to two inputs of a coordinate converter 607, which is an example of the second coordinate converter of the present invention. The second vector quantizer of the present invention corresponds to the coordinate converter 605, the scalar quantizer 606 and the coordinate converter 607.

One of two outputs of the coordinate converter 607 for third data is connected to a first input terminal 855 of a scalar subtracter 608, which is an example of the third scalar subtracter of the present invention. The other of the two outputs of the coordinate converter 607 for fourth data is connected to a first input terminal 857 of a scalar subtracter 609, which is an example of the fourth scalar subtracter of the present invention. The output of the scalar subtracter 603 is input to a second input terminal 856 of the scalar subtracter 608, and the output of the scalar subtracter 604 is input to a second input terminal 858 of the scalar subtracter 609. An output of the scalar subtracter 608 is connected to a second input terminal 852 of the scalar subtracter 603 through a delay device 610. An output of the scalar subtracter 609 is connected to a second input terminal 854 of the scalar subtracter 604 through a delay device 611. Outputs of the coordinate converter 607 are respectively connected to output terminals 612 and 613. The output terminal 612 is an example of the first output terminal of the present invention, and the output terminal 613 is an example of the second output terminal of the present invention.

The operation of this circuit will be described. I data, which is an example of the first data of the present invention, and Q data, which is perpendicular to I data and an example of the second data of the present invention, are respectively input through the input terminals 601 and 602. The I data input through the input terminal 601 is supplied to the coordinate converter 605 via the scalar subtracter 603. The Q data input through the input terminal 602 undergoes the similar processing and is input as the other input to the coordinate converter 605. The coordinate converter 605 performs conversion from an orthogonal coordinate system to a polar coordinate system (amplitude, phase). That is, if outputs from the scalar substractors 603 and 604 are I2 and Q2, respectively, data I2 and data Q2 are converted into data M and θ on the basis of (equation 5) and (equation 6). M is the magnitude (amplitude) of I2 and Q2 expressed by $$M=(I2^2+Q2^2)^{1/2}$$ [Equation 5]

and θ is an angle formed between I2 and Q2 as expressed by $$\theta=\text{Arctan}(Q2/I2)$$ [Equation 6]

Amplitude data M and phase data θ are output from the coordinate converter 605. The scalar quantizer 606 outputs the constant value a. The output from the scalar quantizer 606 is input as one input to the coordinate converter 607. The phase data output from the coordinate converter 605 is input as the other input to the coordinate converter 607. The coordinate converter 607 converts the data in the polar coordinate system into data in the orthogonal coordinate system. That is, the constant value a corresponding to the input amplitude data and the phase data are converted into data in the orthogonal coordinate system: I' data, which is an example of the third data of the present invention, and Q' data, which is an example of the fourth data of the present invention. The third data and the forth data are groups of data converted in correspondence with the first data and the second data of the present invention.

Outputs from the coordinate converter 607 are output through the output terminals 612 and 613 and are input to the scalar subtracters 608 and 609 through the first input terminals 855 and 857 of these scalar subtracters. The outputs from the scalar subtracters 603 and 604 are input to the scalar subtracters 608 and 609 through the second input terminals 856 and 858. The scalar subtracter 608 performs an operation to subtract the output from the scalar subtracter 603 from the output I' from the coordinate converter 607. Similarly, scalar subtracter 609 subtracts the output from the scalar subtracter 604 from the output Q' from the coordinate converter 607. The fifth data and the sixth data output from the scalar subtracters 608 and 609 are delayed by an amount of time corresponding to one clock pulse by the delay devices 610 and 611 and are thereafter input to the scalar subtracters 603 and 604 through the second input terminals 852 and 854 which are the other inputs of these scalar subtracters. The scalar subtracter 603 performs an operation to subtract the output from the delay device 610 from the signal input through the input terminal 601. Similarly, the scalar subtracter 604 performs an operation to subtract the output from the delay device 611 from the signal input through the input terminal 602. While an example of quantization by one value has been described, quantization by any value may be performed. For example, quantization by two values "a" and "b" (a<b) may be performed. In such a case, the magnitude of the output vector from the vector quantizer 303 may be set to "a" when the magnitude of the vector input to the vector quantizer 303 is smaller than the middle value between "a" and "b", and set to "b" when the magnitude of the input vector is larger than or equal to the middle value.

Figure 24:
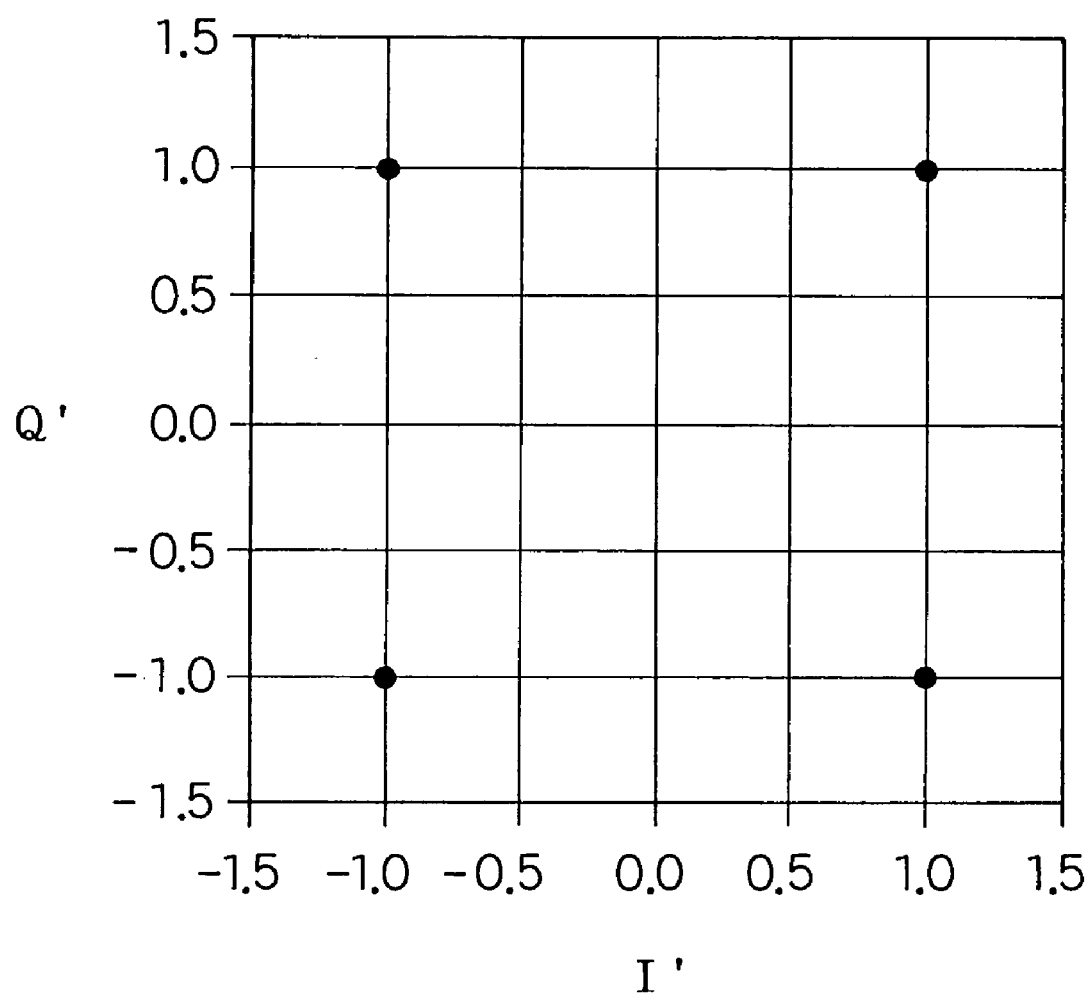
FIG. 24 is a diagram showing output signals from the data converter in Embodiment 3 of the present invention.

Quantization may also be performed with respect to phase. For example, while a case in which the phase of the output vector from the vector quantizer 303 is the same as the phase of the input vector has been described by way of example, the phase of the output vector may be quantized at several points according to the phase of the input vector. For example, the phase may be quantized at four points of 45°, 135°, −45°, and −135°. For example, quantization may be performed with reference to a closest phase point of the vector input to the vector quantizer. That is, a phase of 45° is output when the phase of the input vector is 10°, and a phase of 135° is output when the phase of the input vector is 120°. If the outputs when this operation is performed is I' data and Q' data, the relationship between the I' data and the Q' data is as shown in FIG. 24, in which the abscissa represents the I' data and the ordinate represents the Q' data.

In a case where quantization with respect to phase is also performed, phase quantization may be performed in such a manner that the phase output from the coordinate converter 605 shown in FIG. 23 is quantized by being input to a scalar quantizer (not shown) and the quantization result from this quantizer is input to the coordinate converter 607. In such a case, the scalar quantizer for quantizing the phase is also included in the second vector quantizer of the present invention. The arrangement may alternatively be such that the phase output from the coordinate converter 605 is also input to the scalar quantizer 606 and the scalar quantizer 606 quantizes both the amplitude and the phase.

Description will next be made of a case where a transmitter is formed by using this data converter. The configuration of this transmitter is the same as that in Embodiment 1, as shown in FIG. 7. However, the output waveform with respect to time is an angle-modulated wave of a constant envelope, as shown in FIG. 19. Therefore, even if the amplifier 704 is nonlinear, no intermodulation distortion occurs. Consequently, linearity is not required of the amplifier 704 and the amplifier 704 can operate in the vicinity of a saturation point of its amplification characteristic, thus enabling high-efficiency operation.

Embodiment 4

Embodiment 4 of the present invention will be described with reference to FIG. 25. A transmitter shown in FIG. 25 has a data generator 1201 for generating parallel data, a data converter 1202 in accordance with one of Embodiments 1 to 3 connected to the data generator 1201, a first modulator 1204 connected to the data converter 1202, a first amplifier 1206 connected to the first modulator 1204, a vector subtracter 1203, which has one input side connected to the data generator 1201, and which is an example of the third vector subtracter of the present invention, a second modulator 1205 connected to an output side of the vector subtracter 1203, a second amplifier 1207 connected to the second modulator 1205, a combiner 1208 to which output sides of the first and second amplifiers 1206 and 1207 are connected as inputs, and which combines an output from the first amplifier 1206 and an output from the second amplifier 1207 to output a combined signal, and an antenna 1209 connected to an output side of the combiner 1208. An output of the data converter 1202 is also connected to another input side of the vector subtracter 1203. The vector subtracter 1203 subtracts the parallel data generated by the data generator 1201 from the parallel data converted by the data converter 1202, and thereby outputs quantization noise data. Combining is performed substantially in an equal-amplitude phase-opposition manner with respect to the quantization noise data.

Figure 25:
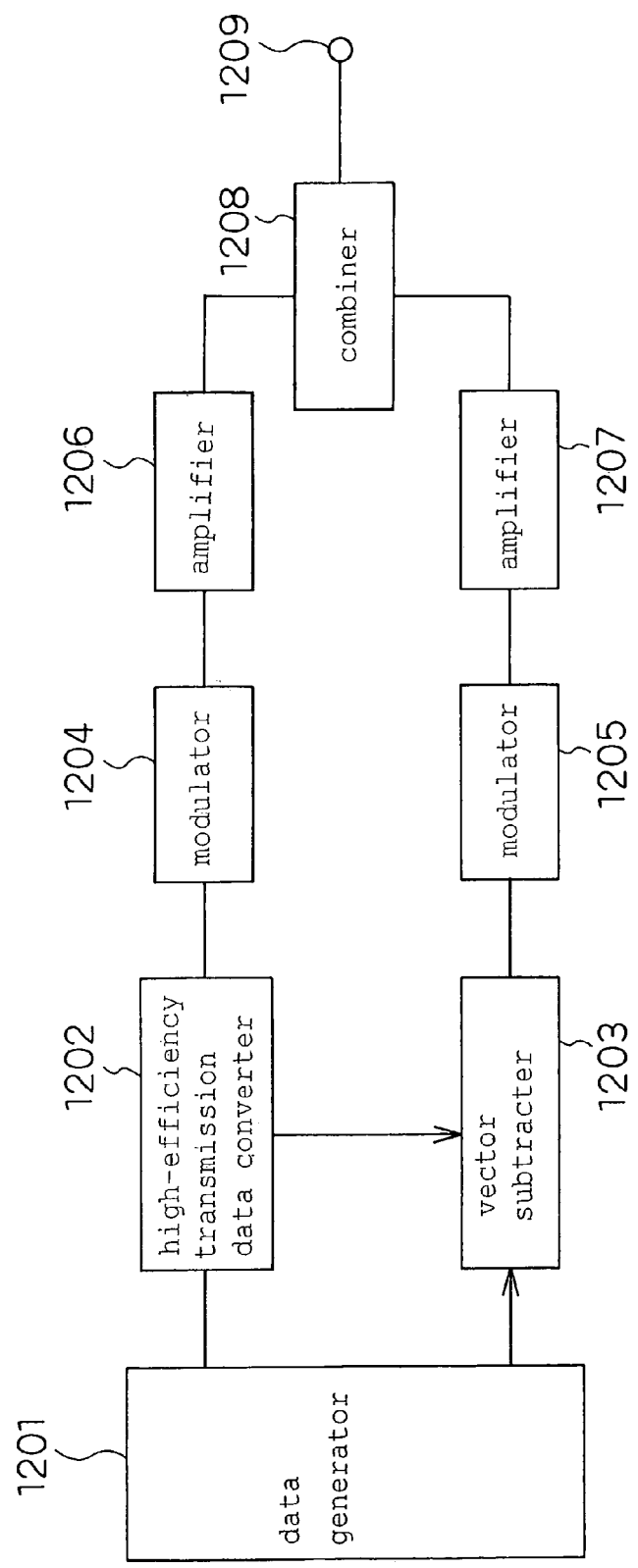
FIG. 25 is a block diagram showing the configuration of a transmitter using a quantization noise cancellation circuit in accordance with the present invention.
Figure 26:
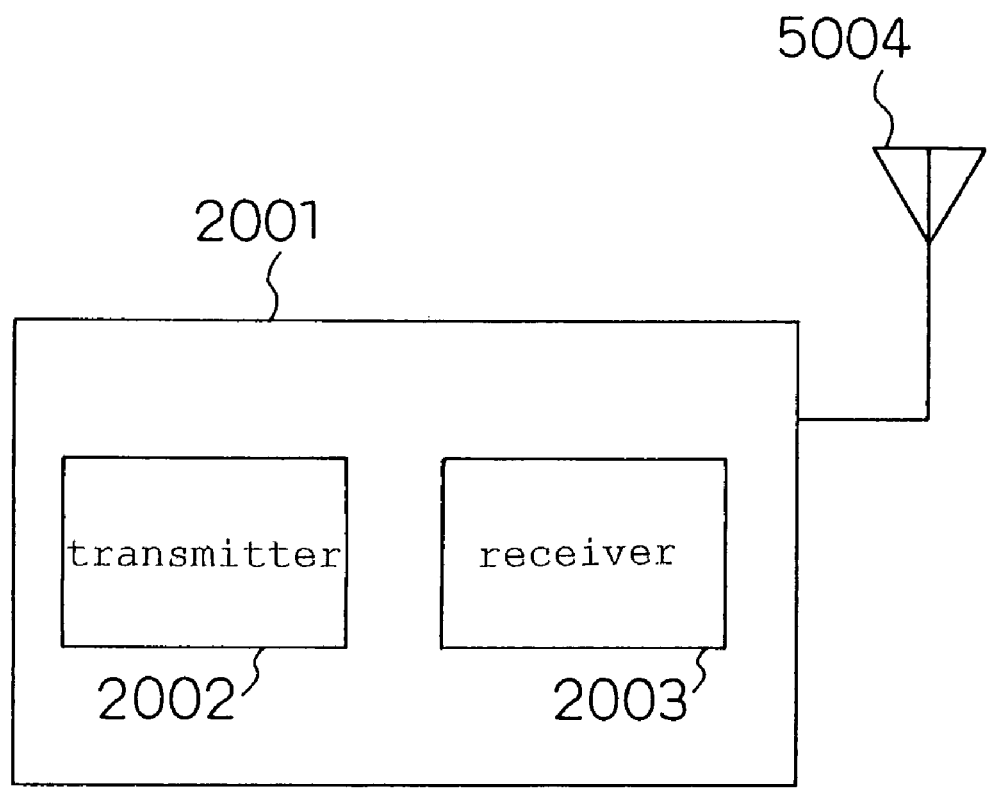
FIG. 26 is a diagram showing the configuration of a communication apparatus of the present invention.
Figure 27:
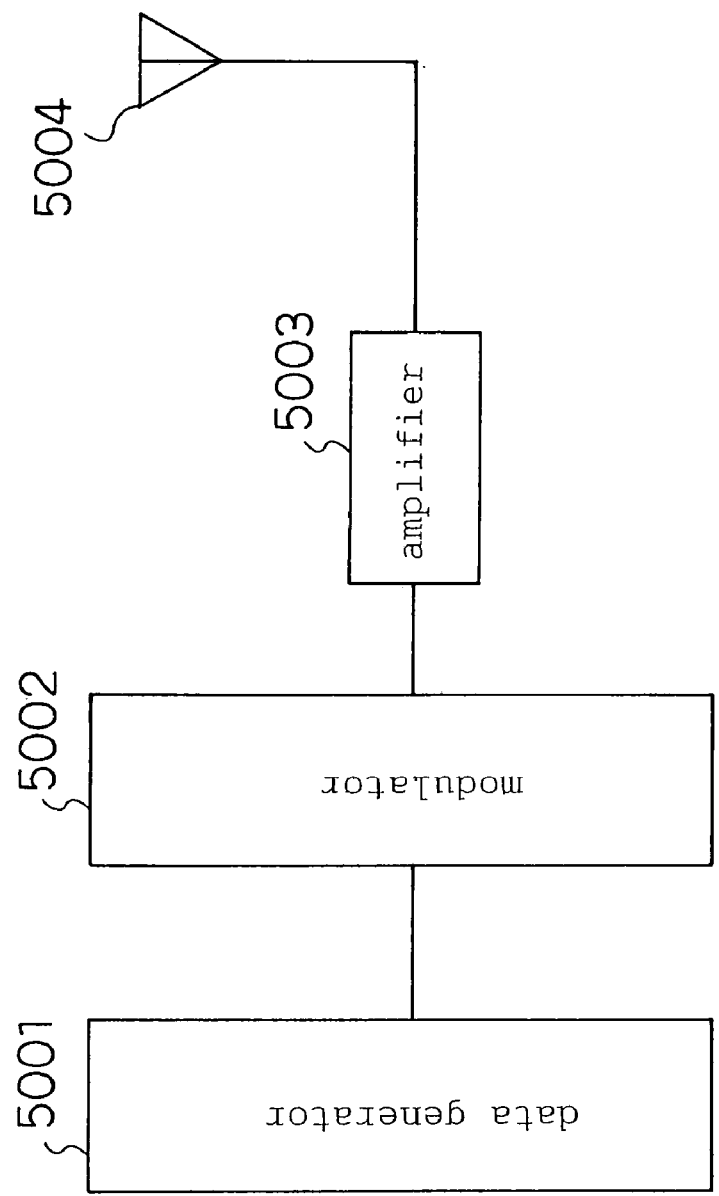
FIG. 27 is a diagram showing the configuration of a conventional transmitter.
Figure 28:
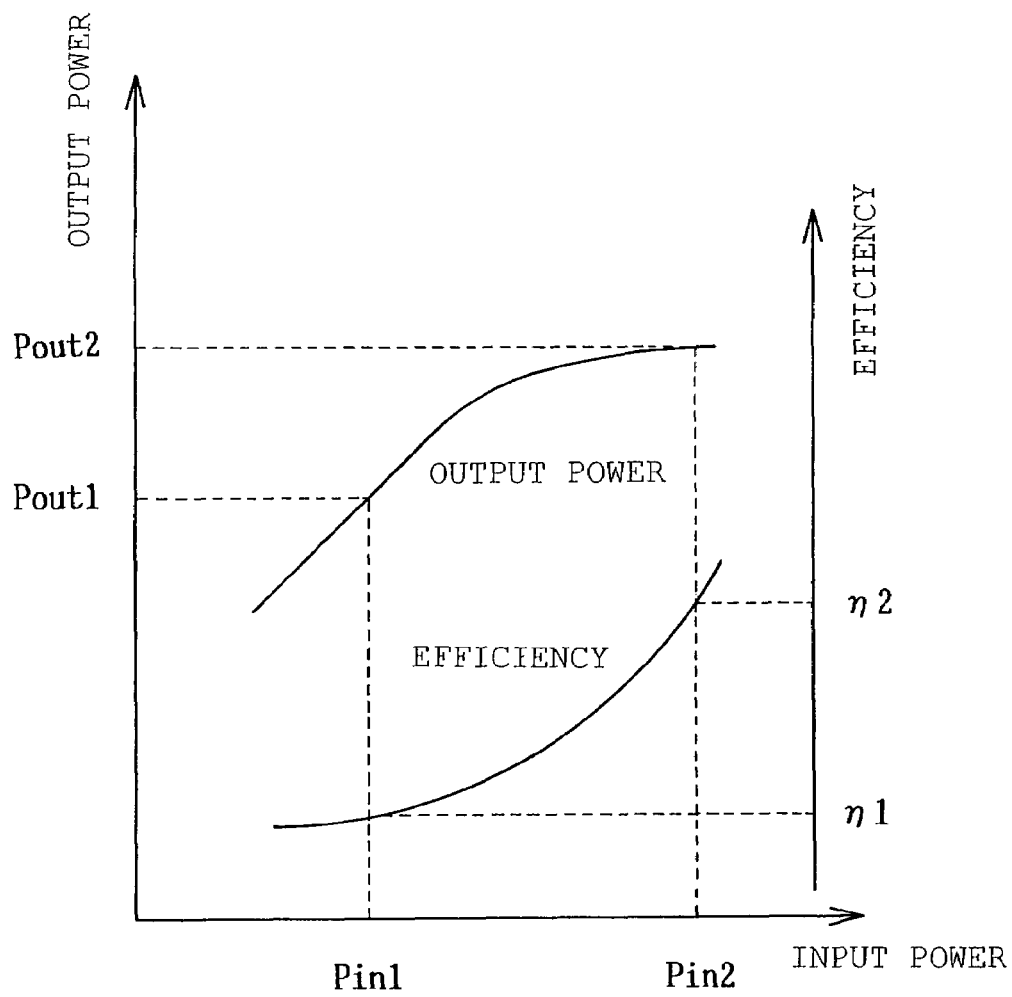
FIG. 28 is a diagram showing characteristics of the conventional transmitter.

In the transmitter shown in FIG. 25, data (assumed to be I and Q) generated by the data generator 1201, which is an example of the data generator of the present invention, are converted into I' and Q' by the high-efficiency transmission data converter 1202. The desired signal obtained as I' and Q' contains quantization noise components, and it is necessary to remove this quantization noise. A method of removing the noise by using a bandpass filter may be used. However, it is difficult to remove the noise by this method since the frequency of the noise is in the vicinity of that of the desired wave. Also, the size of the bandpass filter is large.

In this embodiment, (I, Q) is subtracted from (I', Q') by the vector subtracter 1203 to extract only a noise component. This noise component is modulated by quadrature modulation and amplified, thereafter combined with the signal including the noise component in the combiner 1208. This combining is controlled so that the noise components are virtually in opposite phase with respect to each other, that is, have a phase difference of virtually 180 degrees. That is, the combining is performed by the combiner 1208 so that the noise component output from the vector subtracter 1203 has an amplitude virtually equal to, and a phase virtually opposite to the corresponding noise component contained in the signal output from the data converter 1202.

The above-described configuration and operation ensure that quantization noise can be removed without using a bandpass filter. However, quantization noise spreads through a wide range and it is difficult to remove the entire quantization noise. Therefore, a configuration for removing quantization noise in a certain ranges in the above-described manner and for removing quantization noise out of this range in a bandpass filter may be adopted. In this configuration, a small low-loss bandpass filter can be implemented because the frequency difference between quantization noise and the desired wave is large.

According to the present invention, as described above, data output from a high-efficiency transmission data converter is modulated to obtain a signal as a constant-envelope signal formed in a switching manner. Therefore, linearity is not required of a device connected in a following stage and a high-efficiency transmitter can be realized.

While configurations using delay devices for delaying data by an amount of time corresponding to a predetermined clock pulses have been described, data may be delayed without using a delay device.

In the above description, "each vector quantizer quantizes the amplitude data by multiple values" means that the largest of threshold values smaller than the magnitude of an input vector inn number (n: an integer equal to or larger than 2) of threshold values is selected as an amplitude, and each quantizer outputs a vector in phase with the input vector, outputs a vector having a magnitude corresponding to the largest of the n threshold values and in phase with the input vector if the magnitude of the input vector is larger than the largest threshold value of the n threshold values, and outputs a zero vector if the magnitude of the input vector is smaller than the smallest of the n threshold values.

In the above description, in some cases, both amplitude data and phase data are quantized, however, when only amplitude data is quantized, quantization noise is expected to be reduced.

In the above description, the data converter of the present invention has been referred to as a data converter for transmission. However, the present invention comprises a data converter other than the data converter for transmission, e.g., a data converter for reception. Even in a case where such a data converter is used, the present invention has the same effect in reducing the influence of nonlinearity of an active circuit such as an amplifier.

The present invention also comprises a signal generator having one of the data converters of Embodiments 1 to 3, and a quadrature modulator which performs quadrature modulation of the output from the data converter.

The present invention also comprises a communication apparatus 2001 having a transmitter 2002 and/or receiver 2003 including the above-described data converter or signal generator, and an antenna 5004 for transmitting/receiving a signal.

The above-described data converter and the data conversion method in accordance with the present invention are capable of reducing the influence of nonlinearity of an amplifier and are useful in application to a transmitter, a communication apparatus, etc.

What is claimed is:

1. A data converter comprising:
   a parallel data input terminal through which parallel data having in-phase data and quadrature-phase data are input;
   a computation circuit connected to said parallel data input terminal;
   a first vector quantizer connected to an output side of said computation circuit; and
   an output terminal connected to an output side of said first vector quantizer, wherein said in-phase data and said quadrature-phase data are forming a predetermined vector;

said computation circuit is formed by connecting n (n: a natural number) number of unit circuits each including a first vector subtracter having a first input terminal and a second input terminal, and a vector integrator connected to an output side of said first vector subtracter;

an output at said output terminal and/or an output from said vector integrator in each of said unit circuits is input to the first vector subtracter through the second input terminal of the same in the unit circuit;

said parallel data input terminal is connected to the first input terminal of the first vector subtracter in the first circuit unit;

an output terminal of the vector integrator and the first input terminal of the first vector subtracter are connected to each other between said unit circuits;

said first vector subtracter outputs parallel data obtained by subtracting a vector formed by parallel data input through said second input terminal from a vector formed by parallel data input through said first input terminal; and said vector integrator integrates the vector formed by the input parallel data, and said first vector quantizer outputs a predetermined value quantized at least with respect to the magnitude of an input vector.

2. The data converter according to claim 1, wherein said first vector quantizer outputs a vector having a phase equal to that of the input vector.

3. The data converter according to claim 1, wherein said first vector quantizer outputs a vector having a magnitude corresponding to a predetermined threshold value and having a phase equal to that of the input vector when the magnitude of the vector input to said first vector quantizer is equal to or larger than the predetermined threshold value; and said first vector quantizer outputs a zero vector when the magnitude of the vector input to said first vector quantizer is smaller than the predetermined threshold value.

4. The data converter according to claim 1, wherein said first vector quantizer performs quantization with respect to each of the magnitude and the phase of the vector.

5. A data converter comprising:

a parallel data input terminal through which parallel data having a predetermined vector is input;

a first vector subtracter having a first input terminal and a second input terminal, the first input terminal being connected to said parallel data input terminal;

a second vector quantizer connected to an output side of said first vector subtracter; and an output terminal connected to an output side of said second vector guantizer, wherein said second vector cluantizer outputs a predetermined value cluantizer at least with respect to the magnitude of an input vector;

the quantized predetermined value is input to said first vector subtracter through the second input terminal of the same; and said first vector subtracter outputs parallel data obtained by subtracting a vector formed by parallel data input through said second input terminal from a vector formed by the parallel data input through said first input terminal, said data connector further comprising a second vector subtracter having a first input terminal and a second input terminal, the first input terminal being connected to the output side of said second vector quantizer, wherein an output of said first vector subtracter is also connected to the second input terminal of said second vector subtracter;

said second vector subtracter outputs parallel data obtained by subtracting a vector formed by parallel data input through the second input terminal of said second vector subtracter from a vector formed by parallel data input through the first input terminal of said second vector subtracter; and an output from said second vector quantizer is input to said first vector subtracter through the second input terminal of the same via said second vector subtracter.

6. The data converter according to claim 5, wherein said second vector quantizer outputs a vector having the same phase as that of the input vector.

7. The data converter according to claim 5, wherein said second vector quantizer performs quantization with respect to each of the magnitude and the phase of the vector.

8. The data converter according to claim 1, wherein said first vector subtracter has a first scalar subtracter having a first input terminal and a second input terminal through which first data is input, and a second scalar subtracter having a first input terminal and a second input terminal through which second data in an orthogonal relationship with said first data is input;

said vector integrator has a first scalar integrator connected to an output of said first scalar subtracter, and a second scalar integrator connected to an output of said second scalar subtracter;

said first vector quantizer has a first coordinate converter to which an output from said first scalar integrator and an output from said second scalar integrator are respectively input as data in an orthogonal coordinate system, which converts the input data in the orthogonal coordinate system into data in a polar coordinate system, and which outputs the data in the polar coordinate system as amplitude data and phase data, a first scalar quantizer which quantizes at least the amplitude data output from said first coordinate converter, and a second coordinate converter which is connected to an output side of said first scalar quantizer and/or an output side of said first coordinate converter, and which outputs third data corresponding to the first data and fourth data corresponding to the second data as data in the orthogonal coordinate system from the amplitude data and the phase data output as data in the polar coordinate system from said first scalar quantizer and/or said first coordinate converter;

said first scalar quantizer is connected to the output side of said first coordinate converter and outputs at least amplitude data quantized as the predetermined value;

said output terminal includes a first output terminal which is connected to said second coordinate converter and through which the third data is output, and a second output terminal which is connected to said second coordinate converter and through which the fourth data is output; and at least one of the third data and the output from each of said first scalar integrators is input to at least one of said first scalar subtracters through the second input terminal of the same, and at least one of the fourth data and the output from each of said second scalar integrators is input to at least one of said second scalar subtracters through the second input terminal of the same.

9. The data converter according to claim 8, wherein said number n is 1;
the third data is input to said first scalar subtracter through the second input terminal, said first scalar subtracter subtracts the third data from the first data, and data obtained as a subtraction result by said first scalar subtracter is output to said first scalar integrator; and
the fourth data is input to said second scalar subtracter through the second input terminal, said second scalar subtracter subtracts the fourth data from the second data, and data obtained as a subtraction result by said second scalar subtracter is output to said second scalar integrator.

10. The data converter according to claim 9, wherein said first vector quantizer outputs a vector having the same phase as that of an input vector.

11. The data converter according to claim 9, wherein said first vector quantizer quantizes the amplitude data and also quantizes the phase data.

12. The data converter according to claim 5, wherein said first vector subtracter has a first scalar subtracter having a first input terminal and a second input terminal through which first data is input, and a second scalar subtracter having a first input terminal and a second input terminal through which second data in an orthogonal relationship with the first data is input;
said second vector quantizer has a first coordinate converter to which an output from said first scalar subtracter and an output from said second scalar subtracter are respectively input as data in an orthogonal coordinate system, which converts the input data in the orthogonal coordinate system into data in a polar coordinate system, and which outputs the data in the polar coordinate system as amplitude data. and phase data, a second scalar quantizer which quantizes at least the amplitude data output from said first coordinate converter, and a second coordinate converter which outputs third data corresponding to the first data and fourth data corresponding to the second data obtained by converting the amplitude data and the phase data output as data in the polar coordinate system from said second scalar quantizer and/or said first coordinate converter into data in the orthogonal coordinate system;
said second scalar quantizer is connected to an output side of said first coordinate converter and outputs at least amplitude data quantized as the predetermined value;
said output terminal includes a first output terminal which is connected to said second coordinate converter and through which the third data is output, and a second output terminal which is connected to said second coordinate converter and through which the fourth data is output;
the third data is input to said first scalar subtracter through the second input terminal of the same, said first scalar subtracter subtracts the third data from the first data, and data obtained as a subtraction result by said first scalar subtracter is input to said first coordinate converter as one of two inputs to the same; and
the fourth data is input to said second scalar subtracter through the second input terminal of the same, said second scalar subtracter subtracts the fourth data from the second data, and data obtained as a subtraction result by said second scalar subtracter is input to said first coordinate converter as the other input to the same.

13. The data converter according to claim 12, wherein said second vector quantizer outputs a vector having the same phase as that of an input vector.

14. The data converter according to claim 12, wherein said second vector quantizer quantizes the amplitude data with respect to the magnitude of the vector, and also quantizes the phase data with respect to the phase of the vector.

15. The data converter according to claim 5, wherein said first vector subtracter has a first scalar subtracter having a first input terminal and a second input terminal through which first data is input, and a second scalar subtracter having a first input terminal and a second input terminal through which second data in an orthogonal relationship with the first data is input;
said second vector quantizer has a first coordinate converter to which an output from said first scalar subtracter and an output from said second scalar subtracter are respectively input as data in an orthogonal coordinate system, which converts the input data in the orthogonal coordinate system into data in a polar coordinate system, and which outputs the data in the polar coordinate system as amplitude data and phase data, a second scalar quantizer which quantizes at least the amplitude data output from said first coordinate converter, and a second coordinate converter which outputs third data corresponding to the first data and fourth data corresponding to the second data obtained by converting the amplitude data and the phase data output as data in the polar coordinate system from said second scalar quantizer and/or said first coordinate converter into data in the orthogonal coordinate system;
said second scalar quantizer is connected to an output side of said first coordinate converter and outputs at least amplitude data quantized as the predetermined value;
said second vector subtracter includes a third scalar subtracter which has a first input terminal through which the third data is input, and a second input terminal through which output data from said first scalar subtracter is input, and which outputs fifth data obtained by subtracting the output data from said first scalar subtracter from the third data, and a fourth scalar subtracter which has a first input terminal through which the fourth data is input, and a second input terminal through which output data from said second scalar subtracter is input, and which outputs sixth data obtained by subtracting the output data from said second scalar subtracter from the fourth data;
the fifth data is input to said first scalar subtracter through the second input terminal of the same, said first scalar subtracter subtracts the fifth data from the first data, and data obtained as a subtraction result by said first scalar subtracter is input to said first coordinate converter as one of two inputs to the same; and
the sixth data is input to said second scalar subtracter through the second input terminal of the same, said second scalar subtracter subtracts the sixth data from the second data, and data obtained as a subtraction result by said second scalar subtracter is input to said first coordinate converter as the other input to the same.

16. The data converter according to claim 15, wherein said second vector quantizer outputs a vector having the same phase as that of an input vector.

17. The data converter according to claim 15, wherein said second vector quantizer quantizes the amplitude data with respect to the magnitude of the vector, and also quantizes the phase data with respect to the phase of the vector.

18. The data converter according to claim 1 or 9, wherein said first vector quantizer has n number of threshold values, outputs a vector having a magnitude corresponding to the largest of the n threshold values and having a phase equal to that of a vector input to said first vector quantizer when the magnitude of the input vector to said first vector quantizer is larger than the largest of the n threshold value, outputs a zero vector when the magnitude of the input vector is smaller than the smallest of the n threshold values, and outputs a vector having a magnitude corresponding to the largest of the threshold values smaller than the magnitude of the input vector and having a phase equal to that of the input vector when the magnitude of the input vector is between the smallest and the largest of the n threshold values.

19. The data converter according to claim 5, wherein said second vector quantizer outputs a vector having a predetermined amplitude and a phase equal to that of the input vector.

20. The data converter according to claim 5, wherein said second vector quantizer outputs "a" when the input vector is smaller than the middle value between "a" and "b" (a, b: a real number not negative, a<b), and outputs "b" when the input vector is equal to or larger than the middle value.

21. A signal generator comprising the data converter according to claim 1 or 5, and a quadrature modulator which performs quadrature modulation of an output from said data converter.

22. The signal generator according to claim 21, wherein said data converter is realized by digital signal processing.

23. A transmitter comprising:
the signal generator according to claim 21;
an amplifier directly or indirectly connected to the quadrature modulator of said signal generator;
a bandpass filter connected to said amplifier; and
an antenna directly or indirectly connected to said bandpass filter.

24. The transmitter according to claim 23, further comprising a low-pass filter provided between an output side of said data converter and an input side of said quadrature modulator to transmit a signal output from said data converter to said quadrature modulator while performing low-pass filtering on the signal.

25. The transmitter according to claim 23, wherein the predetermined value is controlled according to the kind of a modulated wave output from the transmitter.

26. The transmitter according to claim 23, wherein the pass frequency of the bandpass filter is controlled according to the frequency of a signal to be output.

27. The transmitter according to claim 23, wherein said data converter generates data for compensation for nonlinearity of said amplifier.

28. A transmitter comprising:
a data generator generating parallel data;
the data converter according to claim 1 or 5 connected to said data generator;
a first modulator connected to said data converter;
a first amplifier connected to said first modulator;
a third vector subtracter having one input side connected to said data generator;
a second modulator connected to an output side of said third vector subtracter;
a second amplifier connected to said second modulator;
a combiner to which an output side of said first amplifier and an output side of said second amplifier are respectively connected as inputs, and which combines an output from said first amplifier and an output from said second amplifier into a combined signal and outputs the combined signal; and
an antenna connected to an output side of said combiner,
wherein an output of said data converter is also connected to another input side of said third vector subtracter;
said third vector subtracter outputs quantization noise data by subtracting parallel data generated by said data generator from parallel data converted by said data converter; and
said combining is performed virtually in an equal-amplitude phase-opposition manner with respect to the quantization noise data.

29. A communication apparatus comprising the transmitter according to claim 24, a receiver for receiving a signal, and an antenna for transmitting and/or receiving a signal.

* * * * *

UNITED STATES PATENT AND TRADEMARK OFFICE
CERTIFICATE OF CORRECTION

| | |
|---|---|
| PATENT NO. | : 7,280,610 B2 |
| APPLICATION NO. | : 10/683476 |
| DATED | : October 9, 2007 |
| INVENTOR(S) | : Toru Matsuura et al. |

It is certified that error appears in the above-identified patent and that said Letters Patent is hereby corrected as shown below:

In column 23, please correct the three misspelled words in claim 5 as follows:

on line 55, change "guantizer" to --quantizer--; and on lines 56 and 57, change "cluantizer" to --quantizer--.

Signed and Sealed this

Tenth Day of June, 2008

JON W. DUDAS
*Director of the United States Patent and Trademark Office*